United States Patent
Li et al.

(10) Patent No.: US 10,305,955 B1
(45) Date of Patent: May 28, 2019

(54) STREAMING DECISION IN THE CLOUD

(71) Applicant: Conviva Inc., San Mateo, CA (US)

(72) Inventors: Yan Li, Foster City, CA (US); Davis Shepherd, Portola Valley, CA (US); Xi Liu, Belmont, CA (US); Jibin Zhan, Foster City, CA (US); Faisal Zakaria Siddiqi, San Jose, CA (US); Aditya Ravikumar Ganjam, San Francisco, CA (US); Ion Stoica, Piedmont, CA (US); Hui Zhang, Pittsburgh, PA (US); Alexey Serbin, Sunnyvale, CA (US)

(73) Assignee: Conviva Inc., Foster City, CA (US)

( * ) Notice: Subject to any disclaimer, the term of this patent is extended or adjusted under 35 U.S.C. 154(b) by 0 days.

(21) Appl. No.: 14/738,719

(22) Filed: Jun. 12, 2015

Related U.S. Application Data

(60) Provisional application No. 62/089,156, filed on Dec. 8, 2014.

(51) Int. Cl.
*H04L 29/06* (2006.01)

(52) U.S. Cl.
CPC ........ *H04L 65/602* (2013.01); *H04L 65/4069* (2013.01); *H04L 65/80* (2013.01)

(58) Field of Classification Search
CPC ............. H04L 65/4069; H04L 65/4084; H04L 65/4092; H04L 65/602; H04L 65/607; H04L 65/608; H04L 65/80; H04L 67/02; H04N 21/23439; H04N 21/2393; H04N 21/2662; H04N 21/8456
See application file for complete search history.

(56) References Cited

U.S. PATENT DOCUMENTS

| | | | |
|---|---|---|---|
| 5,926,204 A | 7/1999 | Mayer | |
| 5,930,473 A | 7/1999 | Teng | |
| 5,987,621 A * | 11/1999 | Duso ................... | G06F 11/2023 348/E5.008 |
| 6,006,264 A | 12/1999 | Colby | |
| 6,026,077 A | 2/2000 | Iwata | |
| 6,208,977 B1 | 3/2001 | Hernandez | |
| 6,223,206 B1 | 4/2001 | Dan | |
| 6,279,039 B1 | 8/2001 | Bhat | |
| 6,324,565 B1 | 11/2001 | Holt, III | |

(Continued)

OTHER PUBLICATIONS

"Relay Nodes in Wireless Sensor Networks: A Survey"—Ataul Bari, University of Windsor, Nov. 2005, http://richard.nyweb.cs.uwindsor.ca/cs510/survey_bari.pdf.

(Continued)

*Primary Examiner* — Christopher Biagini
(74) *Attorney, Agent, or Firm* — Van Pelt, Yi & James LLP

(57) ABSTRACT

Generating streaming decisions at one or more remote servers on behalf of a local client is disclosed. An indication of a content request, multi-dimensional client information, and local state information are received from a client device. A record specific to the client device is generated, in a data store, using the received local state information. The data store includes a plurality of records corresponding to respective different client devices. A set of instructions usable by the client device to obtain and play content is determined based at least in part the local state information received from the client device. The determined set of instructions is transmitted to the client device.

49 Claims, 6 Drawing Sheets

(56) References Cited

U.S. PATENT DOCUMENTS

| | | |
|---|---|---|
| 6,377,996 B1 | 4/2002 | Lumelsky |
| 6,405,251 B1 | 6/2002 | Bullard |
| 6,438,592 B1 | 8/2002 | Killian |
| 6,469,991 B1 | 10/2002 | Chuah |
| 6,470,389 B1 | 10/2002 | Chung |
| 6,711,622 B1 | 3/2004 | Fuller |
| 6,735,630 B1 | 5/2004 | Gelvin |
| 6,754,833 B1 | 6/2004 | Black |
| 6,836,691 B1 | 12/2004 | Stirton |
| 6,892,236 B1 | 5/2005 | Conrad |
| 6,892,307 B1 | 5/2005 | Wood |
| 6,906,743 B1 | 6/2005 | Maurer |
| 6,920,580 B1 | 7/2005 | Cramer |
| 6,950,855 B2 | 9/2005 | Sampathkumar |
| 7,006,666 B2 | 2/2006 | Montgomery |
| 7,010,598 B2 | 3/2006 | Sitaraman |
| 7,020,082 B2 | 3/2006 | Bhagavath |
| 7,024,452 B1 | 4/2006 | O'Connell, Jr. |
| 7,024,468 B1 | 4/2006 | Meyer |
| 7,039,694 B2 | 5/2006 | Kampe |
| 7,092,696 B1 | 8/2006 | Hosain |
| 7,139,834 B1 | 11/2006 | Albanese |
| 7,159,234 B1 * | 1/2007 | Murphy ............... G06F 11/2028 714/11 |
| 7,222,190 B2 | 5/2007 | Klinker |
| 7,277,896 B2 | 10/2007 | Matsubara |
| 7,313,087 B2 | 12/2007 | Patil |
| 7,318,107 B1 | 1/2008 | Menon |
| 7,356,341 B2 | 4/2008 | Nanda |
| 7,367,044 B2 | 4/2008 | Fowler |
| 7,373,415 B1 | 5/2008 | Deshan |
| 7,389,537 B1 | 6/2008 | Callon |
| 7,487,509 B2 | 2/2009 | Hugly |
| 7,490,136 B2 | 2/2009 | Suzuki |
| 7,509,372 B2 | 3/2009 | Dutta |
| 7,519,703 B1 | 4/2009 | Stuart |
| 7,574,488 B2 | 8/2009 | Matsubara |
| 7,593,333 B2 | 9/2009 | Li |
| 7,599,698 B2 | 10/2009 | Cheng |
| 7,617,525 B1 | 11/2009 | Moeck |
| 7,620,848 B1 | 11/2009 | Tanner |
| 7,627,872 B2 | 12/2009 | Hebeler |
| 7,668,761 B2 | 2/2010 | Jenkins |
| 7,668,914 B2 | 2/2010 | Parker |
| 7,689,485 B2 | 3/2010 | Kanekar |
| 7,698,460 B2 | 4/2010 | Zhang |
| 7,721,292 B2 | 5/2010 | Frasier |
| 7,725,576 B2 | 5/2010 | Sitaraman |
| 7,813,326 B1 | 10/2010 | Kelm |
| 7,844,491 B1 | 11/2010 | Haitsuka |
| 7,873,727 B2 | 1/2011 | Pal |
| 7,904,580 B2 | 3/2011 | Mandera |
| 7,921,215 B2 | 4/2011 | Dessart |
| 7,921,222 B2 | 4/2011 | Courtemanche |
| 7,930,347 B2 | 4/2011 | Maxwell |
| 7,941,823 B2 | 5/2011 | Hasek |
| 7,969,987 B1 | 6/2011 | Hansen |
| 7,970,402 B2 | 6/2011 | Wu |
| 8,028,159 B2 | 9/2011 | Li |
| 8,038,535 B2 | 10/2011 | Jensen |
| 8,046,765 B2 | 10/2011 | Cherkasova |
| 8,108,403 B2 | 1/2012 | Gopalraj |
| 8,135,855 B2 | 3/2012 | Sitaraman |
| 8,156,204 B2 | 4/2012 | Leblanc |
| 8,182,326 B2 | 5/2012 | Speer, II |
| 8,230,105 B2 | 7/2012 | Melnyk |
| 8,234,350 B1 | 7/2012 | Gu |
| 8,259,597 B1 | 9/2012 | Oak |
| 8,370,887 B2 | 2/2013 | Virdi |
| 8,374,929 B1 | 2/2013 | Lappas |
| 8,387,094 B1 | 2/2013 | Ho |
| 8,417,797 B2 | 4/2013 | Thoen |
| 8,484,319 B2 | 7/2013 | Wein |
| 8,489,683 B2 | 7/2013 | Leblanc |
| 8,489,923 B1 | 7/2013 | Lakshminarayanan |
| 8,589,473 B2 | 11/2013 | Bruss |
| 8,639,553 B1 | 1/2014 | Knauth |
| 8,677,428 B2 | 3/2014 | Lewis |
| 8,683,066 B2 | 3/2014 | Hurst |
| 8,751,605 B1 | 6/2014 | Zhang |
| 8,751,679 B2 | 6/2014 | McHugh |
| 8,843,597 B2 | 9/2014 | Leblanc |
| 8,874,725 B1 | 10/2014 | Ganjam |
| 8,874,964 B1 | 10/2014 | Lakshminarayanan |
| 8,898,338 B1 * | 11/2014 | McGowan ............ H04L 65/4084 709/248 |
| 8,924,996 B2 | 12/2014 | Shafiee |
| 8,930,991 B2 | 1/2015 | Philpott |
| 8,943,170 B2 | 1/2015 | Li |
| 8,954,491 B1 | 2/2015 | Medved |
| 9,100,288 B1 | 8/2015 | Ganjam |
| 9,356,821 B1 * | 5/2016 | Jagannathan ..... H04L 29/08144 |
| 9,456,015 B2 | 9/2016 | Chen |
| 9,549,043 B1 | 1/2017 | Stoica |
| 9,613,042 B1 | 4/2017 | Joseph |
| 9,819,566 B1 | 11/2017 | Ganjam |
| 2002/0002708 A1 | 1/2002 | Arye |
| 2002/0016831 A1 | 2/2002 | Peled |
| 2002/0082730 A1 | 6/2002 | Capps |
| 2002/0095400 A1 | 7/2002 | Johnson |
| 2002/0126135 A1 | 9/2002 | Ball |
| 2002/0141343 A1 | 10/2002 | Bays |
| 2002/0143798 A1 | 10/2002 | Lisiecki |
| 2002/0175934 A1 | 11/2002 | Hand |
| 2002/0183972 A1 | 12/2002 | Enck |
| 2002/0184357 A1 | 12/2002 | Traversat |
| 2002/0198984 A1 | 12/2002 | Goldstein |
| 2003/0046383 A1 | 3/2003 | Lee |
| 2003/0046396 A1 | 3/2003 | Richter |
| 2003/0046704 A1 | 3/2003 | Laksono |
| 2003/0046708 A1 | 3/2003 | Jutzi |
| 2003/0050966 A1 | 3/2003 | Dutta |
| 2003/0051051 A1 | 3/2003 | O'Neal |
| 2003/0061305 A1 | 3/2003 | Copley |
| 2003/0061356 A1 | 3/2003 | Jason, Jr. |
| 2003/0065739 A1 | 4/2003 | Shnier |
| 2003/0065763 A1 | 4/2003 | Swildens |
| 2003/0074142 A1 | 4/2003 | Steeg |
| 2003/0084003 A1 | 5/2003 | Pinkas |
| 2003/0105850 A1 | 6/2003 | Lean |
| 2003/0135593 A1 | 7/2003 | Lee |
| 2003/0140108 A1 | 7/2003 | Sampathkumar |
| 2003/0140180 A1 * | 7/2003 | Brown ................... G06F 9/547 719/330 |
| 2003/0145066 A1 | 7/2003 | Okada |
| 2003/0169863 A1 | 9/2003 | Hernandez |
| 2003/0204613 A1 | 10/2003 | Hudson |
| 2004/0010544 A1 | 1/2004 | Slater |
| 2004/0019675 A1 | 1/2004 | Hebeler |
| 2004/0047354 A1 | 3/2004 | Slater |
| 2004/0049793 A1 | 3/2004 | Chou |
| 2004/0057420 A1 | 3/2004 | Curcio |
| 2004/0064556 A1 | 4/2004 | Zhang |
| 2004/0088347 A1 | 5/2004 | Yeager |
| 2004/0093155 A1 | 5/2004 | Simonds |
| 2004/0107387 A1 | 6/2004 | Larsson |
| 2004/0128682 A1 | 7/2004 | Liga |
| 2004/0133471 A1 | 7/2004 | Pisaris-Henderson |
| 2004/0136327 A1 | 7/2004 | Sitaraman |
| 2004/0158643 A1 | 8/2004 | Suzuki |
| 2004/0162901 A1 | 8/2004 | Mangipudi |
| 2004/0187159 A1 | 9/2004 | Gaydos |
| 2004/0193716 A1 | 9/2004 | McConnell |
| 2004/0233918 A1 | 11/2004 | Larsson |
| 2004/0236846 A1 | 11/2004 | Alvarez |
| 2004/0267691 A1 | 12/2004 | Vasudeva |
| 2005/0010915 A1 | 1/2005 | Chen |
| 2005/0021715 A1 | 1/2005 | Dugatkin |
| 2005/0060158 A1 | 3/2005 | Endo |
| 2005/0076104 A1 | 4/2005 | Liskov |
| 2005/0086300 A1 | 4/2005 | Yeager |
| 2005/0086469 A1 | 4/2005 | Dunagan |
| 2005/0120131 A1 | 6/2005 | Allen |
| 2005/0169179 A1 | 8/2005 | Antal |

(56) References Cited

U.S. PATENT DOCUMENTS

| | | |
|---|---|---|
| 2005/0183120 A1 | 8/2005 | Jain |
| 2005/0243735 A1 | 11/2005 | Kashima |
| 2005/0251835 A1 | 11/2005 | Scott |
| 2005/0278259 A1 | 12/2005 | Gunaseelan |
| 2006/0052100 A1 | 3/2006 | Almgren |
| 2006/0059248 A1 | 3/2006 | Ikeda |
| 2006/0075094 A1 | 4/2006 | Wen |
| 2006/0085246 A1 | 4/2006 | Li |
| 2006/0123080 A1 | 6/2006 | Baudino |
| 2006/0135172 A1 | 6/2006 | Dronne |
| 2006/0136218 A1 | 6/2006 | Lee |
| 2006/0136597 A1 | 6/2006 | Shabtai |
| 2006/0143350 A1 | 6/2006 | Miloushev |
| 2006/0168304 A1 | 7/2006 | Bauer |
| 2006/0179154 A1 | 8/2006 | Sitaraman |
| 2006/0190615 A1 | 8/2006 | Panwar |
| 2006/0206539 A1 | 9/2006 | Thompson |
| 2006/0236017 A1 | 10/2006 | Rooholamini |
| 2006/0246880 A1 | 11/2006 | Baldwin |
| 2006/0259949 A1 | 11/2006 | Schaefer |
| 2006/0285489 A1 | 12/2006 | Francisco |
| 2007/0005809 A1 | 1/2007 | Kobayashi |
| 2007/0025381 A1 | 2/2007 | Feng |
| 2007/0041584 A1 | 2/2007 | O'Connor |
| 2007/0066403 A1 | 3/2007 | Conkwright |
| 2007/0101202 A1 | 5/2007 | Garbow |
| 2007/0136311 A1 | 6/2007 | Kasten |
| 2007/0140113 A1 | 6/2007 | Gemelos |
| 2007/0150612 A1 | 6/2007 | Chaney |
| 2007/0183427 A1 | 8/2007 | Nylander |
| 2007/0198413 A1 | 8/2007 | Nagao |
| 2007/0204011 A1 | 8/2007 | Shaver |
| 2007/0232332 A1 | 10/2007 | Holur |
| 2007/0250560 A1 | 10/2007 | Wein |
| 2007/0282994 A1 | 12/2007 | Beers |
| 2007/0286351 A1 | 12/2007 | Ethier |
| 2007/0288638 A1 | 12/2007 | Vuong |
| 2008/0016205 A1 | 1/2008 | Svendsen |
| 2008/0037438 A1 | 2/2008 | Twiss |
| 2008/0046499 A1 | 2/2008 | Cabrera |
| 2008/0046777 A1 | 2/2008 | Chen |
| 2008/0046974 A1 | 2/2008 | Minodier |
| 2008/0049616 A1 | 2/2008 | Kamath |
| 2008/0049786 A1 | 2/2008 | Ram |
| 2008/0063195 A1 | 3/2008 | Li |
| 2008/0096562 A1 | 4/2008 | Wu |
| 2008/0104454 A1 | 5/2008 | White |
| 2008/0112315 A1 | 5/2008 | Hu |
| 2008/0140688 A1 | 6/2008 | Clayton |
| 2008/0141131 A1 | 6/2008 | Cerny |
| 2008/0144513 A1 | 6/2008 | Small |
| 2008/0151821 A1 | 6/2008 | Cho |
| 2008/0155586 A1 | 6/2008 | Yang |
| 2008/0195461 A1 | 8/2008 | Li |
| 2008/0209499 A1 | 8/2008 | Ramesh |
| 2008/0215718 A1 | 9/2008 | Stolorz |
| 2008/0235746 A1 | 9/2008 | Peters |
| 2008/0247326 A1 | 10/2008 | Cormier |
| 2008/0263180 A1 | 10/2008 | Hurst |
| 2008/0305801 A1 | 12/2008 | Burgess |
| 2008/0313040 A1 | 12/2008 | Rose |
| 2009/0010155 A1 | 1/2009 | Liu |
| 2009/0019503 A1 | 1/2009 | Vorbau |
| 2009/0043906 A1 | 2/2009 | Hurst |
| 2009/0059812 A1 | 3/2009 | Chinnaswamy |
| 2009/0082020 A1 | 3/2009 | Ch'ng |
| 2009/0083631 A1 | 3/2009 | Sidi |
| 2009/0106392 A1 | 4/2009 | Zuckerman |
| 2009/0117893 A1 | 5/2009 | Weigand |
| 2009/0119722 A1 | 5/2009 | Versteeg |
| 2009/0125625 A1 | 5/2009 | Shim |
| 2009/0150487 A1 | 6/2009 | Wolfish |
| 2009/0164656 A1 | 6/2009 | Guan |
| 2009/0172200 A1 | 7/2009 | Morrison |
| 2009/0187956 A1 | 7/2009 | Sommer |
| 2009/0192929 A1 | 7/2009 | Hoeflinger |
| 2009/0234940 A1 | 9/2009 | Pal |
| 2009/0248872 A1 | 10/2009 | Luzzatti |
| 2009/0271101 A1 | 10/2009 | Relyea |
| 2009/0327489 A1 | 12/2009 | Swildens |
| 2009/0328124 A1 | 12/2009 | Khouzam |
| 2010/0043014 A1 | 2/2010 | Hebeler, Jr. |
| 2010/0080290 A1 | 4/2010 | Mehrotra |
| 2010/0088373 A1 | 4/2010 | Pinkham |
| 2010/0100635 A1 | 4/2010 | Takemura |
| 2010/0114562 A1 | 5/2010 | Hutchinson |
| 2010/0125675 A1 | 5/2010 | Richardson |
| 2010/0131642 A1 | 5/2010 | Chalikouras |
| 2010/0138273 A1 | 6/2010 | Bateni |
| 2010/0161729 A1 | 6/2010 | Leblanc |
| 2010/0169195 A1 | 7/2010 | Trest |
| 2010/0235503 A1 | 9/2010 | Sitaraman |
| 2010/0241701 A1 | 9/2010 | Lester |
| 2010/0302002 A1 | 12/2010 | Guo |
| 2010/0306368 A1 | 12/2010 | Gagliardi |
| 2011/0014972 A1 | 1/2011 | Herrmann |
| 2011/0016225 A1 | 1/2011 | Park |
| 2011/0047413 A1* | 2/2011 | McGill ............... G06F 11/1662 714/15 |
| 2011/0058675 A1 | 3/2011 | Brueck |
| 2011/0060649 A1 | 3/2011 | Dunk |
| 2011/0082946 A1 | 4/2011 | Gopalakrishnan |
| 2011/0179435 A1 | 7/2011 | Cordray |
| 2011/0196943 A1 | 8/2011 | Bornstein |
| 2011/0202593 A1 | 8/2011 | Vaderna |
| 2011/0258049 A1 | 10/2011 | Ramer |
| 2011/0296048 A1 | 12/2011 | Knox |
| 2011/0314130 A1 | 12/2011 | Strasman |
| 2012/0007866 A1* | 1/2012 | Tahan ................. G06F 19/321 345/428 |
| 2012/0047542 A1 | 2/2012 | Lewis |
| 2012/0093098 A1 | 4/2012 | Charbit |
| 2012/0110167 A1 | 5/2012 | Joch |
| 2012/0124179 A1* | 5/2012 | Cappio ................ H04L 65/104 709/219 |
| 2012/0173753 A1 | 7/2012 | Moorthy |
| 2012/0178426 A1 | 7/2012 | Filipov |
| 2012/0198492 A1 | 8/2012 | Dhruv |
| 2012/0204068 A1 | 8/2012 | Ye |
| 2012/0209717 A1 | 8/2012 | Henry |
| 2012/0226734 A1 | 9/2012 | Poese |
| 2012/0231885 A1 | 9/2012 | Speer, II |
| 2012/0240176 A1 | 9/2012 | Ma |
| 2012/0278496 A1 | 11/2012 | Hsu |
| 2013/0067052 A1* | 3/2013 | Reynolds ............... H04L 67/02 709/223 |
| 2013/0067109 A1 | 3/2013 | Dong |
| 2013/0091249 A1* | 4/2013 | McHugh .......... H04N 21/23439 709/219 |
| 2013/0094445 A1 | 4/2013 | De Foy |
| 2013/0124724 A1 | 5/2013 | Madgwick |
| 2013/0132605 A1 | 5/2013 | Kocks |
| 2013/0142129 A1 | 6/2013 | Rinne |
| 2013/0151673 A1 | 6/2013 | Gouache |
| 2013/0151687 A1 | 6/2013 | Mooneyham |
| 2013/0159531 A1* | 6/2013 | Katyal ................. H04W 28/20 709/226 |
| 2013/0198328 A1 | 8/2013 | Green et al. |
| 2013/0305299 A1 | 11/2013 | Bergstrom |
| 2013/0326024 A1* | 12/2013 | Chen ................. H04L 65/4084 709/219 |
| 2014/0108671 A1 | 4/2014 | Watson |
| 2014/0149557 A1 | 5/2014 | Lohmar |
| 2014/0150046 A1 | 5/2014 | Epstein |
| 2014/0198641 A1* | 7/2014 | Perkuhn ................ H04W 4/18 370/230 |
| 2014/0245359 A1 | 8/2014 | De Foy |
| 2014/0330980 A1 | 11/2014 | Richardson |
| 2014/0348049 A1 | 11/2014 | Kim |
| 2015/0026239 A1 | 1/2015 | Hofmann |
| 2015/0095704 A1 | 4/2015 | Sokolik |

(56) References Cited

U.S. PATENT DOCUMENTS

2015/0334153 A1   11/2015  Koster
2016/0072716 A1   3/2016   Chow
2016/0234293 A1   8/2016   Berger

OTHER PUBLICATIONS

"Simple Opportunistic Routing Protocol for Wireless Mesh Networks"—Rozner et al, University of Texas at Austin, Aug. 2011 http://ericrozner.com/papers/wimesh06.pdf.
Elo et al., "Virtual URLs for Browsing & Searching Large Information Spaces", WebNet Journal, pp. 38-43, p. 66, Jan.-Mar. 1999. http://www.cs.berkeley.edu/~kubitron/articles/techreview.pdf "The Internet Reborn"—Wade Roush, Technology Review, Oct. 2003.
Theotokis et al., A Survey of Peer-to-Peer Content Distribution Technologies, ACM Computing Surveys, vol. 36, No. 4, Dec. 2004, pp. 335-371.
Wade Roush, Technology Review, Published by MIT, TR10: Peering into Video's Future, Mar. 12, 2007, http://technologyreview.com/printer_friendly_article.aspx?id=18284.
"Firefly-Inspired Heartbeat Synchronization in Overlay Networks"—Binci et al., University of Bologna, Italy, Feb. 2007 http://www.cs.unibo.it/babaoglu/courses/cas06-07/papers/pdf/fireflies.pdf.

\* cited by examiner

STREAMING DECISION IN THE CLOUD

CROSS REFERENCE TO OTHER APPLICATIONS

This application claims priority to U.S. Provisional Patent Application No. 62/089,156 entitled STREAMING DECISION IN THE CLOUD filed Dec. 8, 2014 which is incorporated herein by reference for all purposes.

BACKGROUND OF THE INVENTION

With the various types of devices and video players used in video streaming, keeping clients updated in a complex video streaming ecosystem can be challenging. Moreover, as the different clients are of numerous types with different users, determining how to optimize the viewing experience for the disparate clients can be difficult.

BRIEF DESCRIPTION OF THE DRAWINGS

Various embodiments of the invention are disclosed in the following detailed description and the accompanying drawings.

DETAILED DESCRIPTION

Figure 1A:
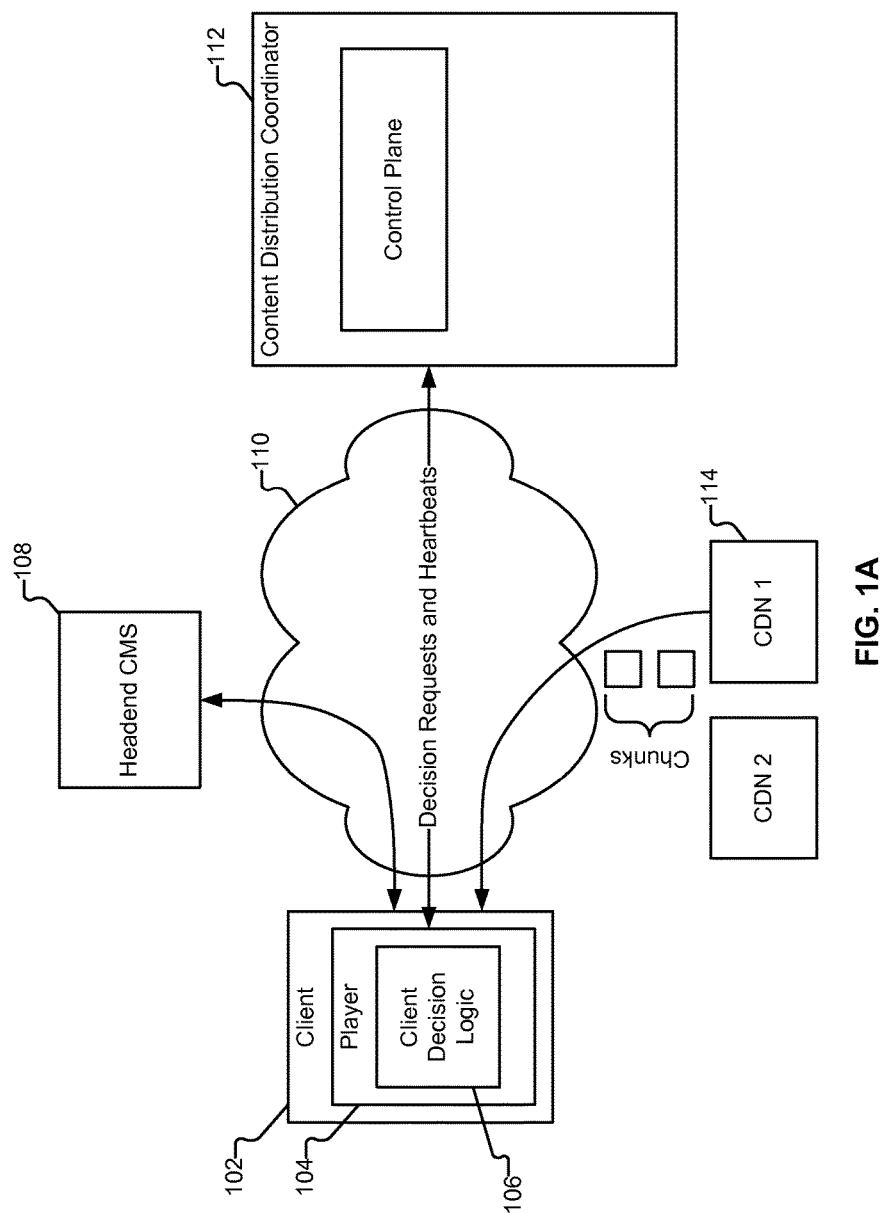
FIG. 1A illustrates an example embodiment of an environment in which streaming decisions for video playback are made by a video player device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Content Distribution Overview

In distributing content, client devices are used to access content, such as audiovisual content (e.g., movies, songs, television shows, sporting events, games, images, etc.) that is owned by content owners. Content is stored (or captured) at origin servers, then distributed via other servers, caches, content delivery networks (CDNs), proxies etc. (collectively, "content sources"). Examples of CDNs include Akamai, Limelight Networks, and Level 3 Communications. Content sources employ a variety of technologies and include HTTP, Adobe Flash Media, and Microsoft Internet Information Service servers.

When requesting content, the client is directed to a particular CDN and ultimately to a particular CDN node. The client device then begins streaming content from the CDN node, which is in turn rendered on the client device (e.g., via a Flash, Silverlight, or HTML5 player if a web browser application is being used). Examples of client devices include personal computers, laptops, cellular phones/personal digital assistants, and other types of information appliances such as set-top boxes, game consoles, smart TVs, broadband routers, file servers, video servers, and digital video recorders, as applicable.

Content distribution can be divided logically into two planes, the data plane and the control plane. When performing video streaming online, the data plane, as used herein, refers to a communication path for actual video data (e.g., data bytes) that makes up video frames and ultimately appears as images moving on a screen. When streaming video, a video file is separated into discrete chunks, which are delivered to clients via the data plane. Various chunking solutions are used, such as Apple® HLS (HTTP live streaming), HDS, etc. The chunking solutions/protocols are used to segment a video file into smaller pieces (i.e., chunks). Different protocols, such as HTTP and RTMP based protocols, may use different chunk sizes of different lengths (e.g., specified in seconds), resolutions, etc.

The control plane, as used herein, refers to a channel for metadata information and additional control protocols that describes and affects how the actual video data is being streamed. This can include an indication of where to obtain video data from, as well as the types of data that should be obtained at a particular time. For example, the information can indicate that data is to be obtained prior to, at the beginning of, or in the middle of a content playback session. As used herein, a session refers to an entity representing an instance of a user's playback interactions with a content asset. The session may begin with a user's request for a particular content, and end when the user ceases playing the content (e.g., the user stops watching a requested video).

The information can also include various other control information such as whether a client should switch from one content distribution path to a more efficient path, whether the client should be obtaining video data of a different resolution (e.g., higher resolution video stream versus lower resolution video stream), etc. The information provided via the control plane is communicated dynamically, in real time. In some embodiments, the control plane is also used to collect (e.g., from a client device) performance statistics regarding playback.

In the example environments of FIGS. 1A and 1B below, a backend provides a portion of or all of the control plane, while the data plane is provided by content sources such as content delivery networks (CDNs), which push actual video data to clients.

As will be described in further detail below, the example environment of FIG. 1A includes not only a control plane backend, but also active code that is running on video playing devices/clients. Decisions regarding streaming (e.g., selection of bitrate, resolutions, CDN, etc.) are split across both the backend and the client, where, for example, the backend supports and facilitates in making client decisions (e.g., making suggested streaming decisions), while the active code running on the clients is configured to make a final streaming decision.

Figure 1B:
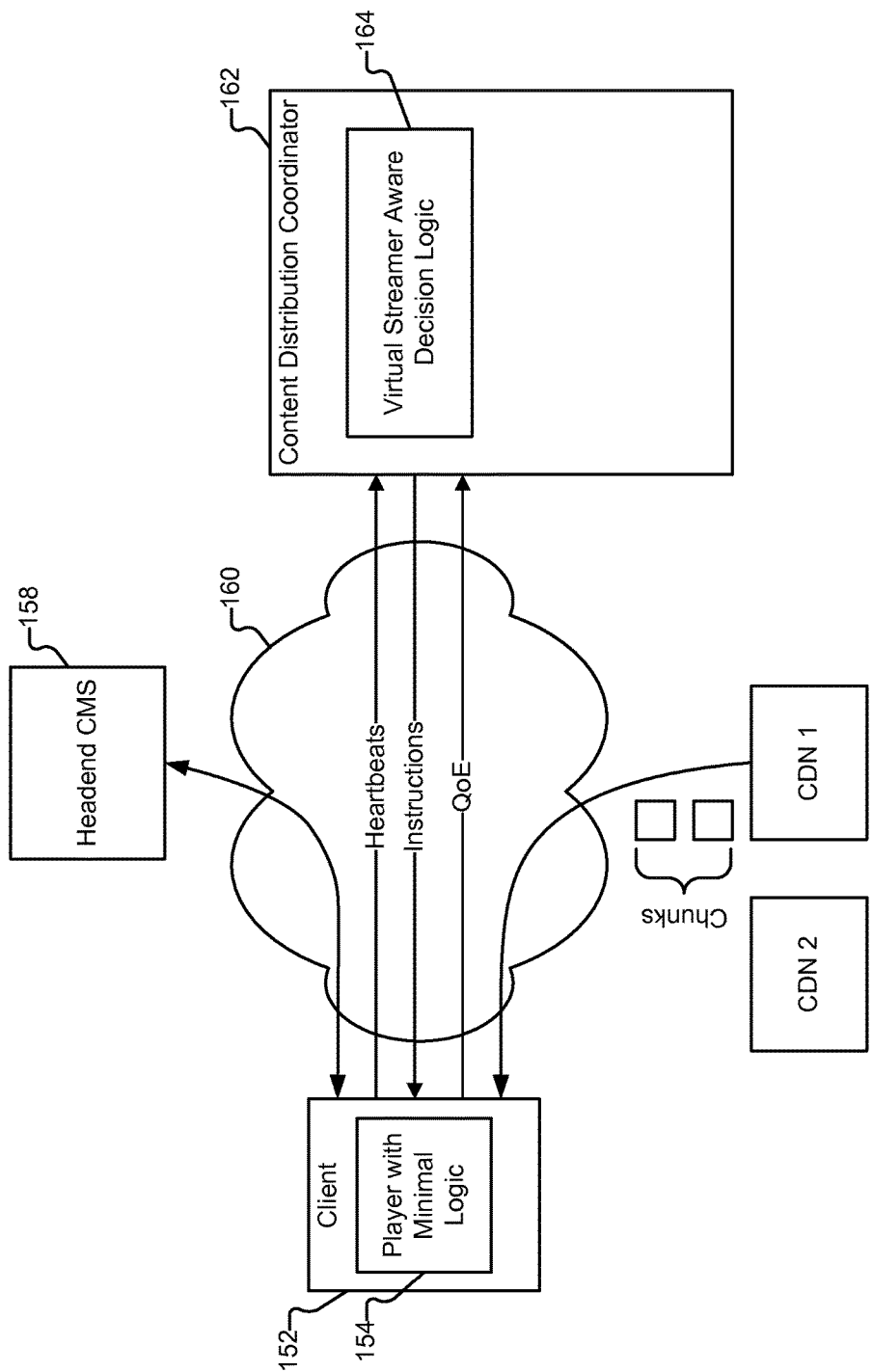
FIG. 1B illustrates an example embodiment of an environment in which cloud-based video playback streaming decision-making is performed.

The example implementation of FIG. 1B describes a video streaming model in which the bulk of the streaming decision logic is migrated to a backend. Here, the backend makes the streaming decisions on behalf of the client and sends the clients instructions based on the decision. A minimal amount of logic is maintained on the client, for example, to allow for collection of local information to monitor local client playback and to enforce the decisions made by the backend. As will be described in further detail below, having the backend configured to make client-specific decisions provides various improvements, such as to the control plane.

While example embodiments in a video streaming (e.g., live and on-demand streaming) ecosystem are described below, the techniques described herein can variously be adapted to accommodate any type of multimedia/audiovisual content distribution, as applicable.

Client-Side Streaming Decision for Playback Environment

FIG. 1A illustrates an example embodiment of an environment in which streaming decisions for video playback are made by a video player device.

In the example shown, client device 102 includes video player (104) that is configured with logic (106) to make streaming decisions for video playback, locally, at the client.

Suppose that an operator of client device 102 wishes to watch a video using video player application 104. In some embodiments, the player application is a dedicated application. In other embodiments, the player application is provided by a web browser application. In the example shown, the player application 104 resident on client device 102 connects to Content Management System (CMS) 108 (e.g., via one or more networks 110) and requests the content.

In some embodiments, content management system 108 contacts content distribution coordinator 112 (also referred to herein as a "CDC") to facilitate client device 102's decision for obtaining the requested content. In other embodiments, content management system 108 redirects client 102's request (e.g., via HTTP redirect) to the content distribution coordinator.

In this example, the content distribution coordinator is configured to operate the control plane. For example, the content distribution coordinator is configured to facilitate and support the client in making a streaming decision. For example, the CDC determines suggested content sources and/or bitrates for client 102, which makes an ultimate decision regarding how content is to be obtained.

In this example, the content distribution coordinator is configured to make the suggestion of content source and/or bitrate by using global data obtained/collected/aggregated from various clients. The aggregated data provides a global view of content distribution and can include the quality experienced and measured by clients that is stored by the content distribution coordinator.

In some embodiments, the content distribution coordinator uses the global data to identify a set of clients that is correlated to the requesting client 102 (e.g., based on client attributes/parameters such as IP address, user agent, operating system, device type, etc.) and to predict the requesting client's performance given different selections of content source and/or bitrate. The content distribution coordinator then generates a set of selections, alternatives, suggestions, or options of content source and/or bitrate to include in the instructions that are provided to the client. The content distribution coordinator may also send hints for suggested/recommended content sources and/or bitrates. The candidate content sources and/or bitrates determined by the content distribution coordinator can also be determined based on policy information, where different policies may be applicable for certain types of traffic, devices, etc.

Client 102, using client decision logic 106 (which may be implemented, for example, as a library), is in turn configured to make an ultimate decision regarding content source and/or bitrate, for example, by making a selection from the options generated and provided by the content distribution coordinator. In some embodiments, the client decision logic uses local information (e.g., local state information, such as local history, local user settings, etc.) to make, locally at the client, the final decision of which of the proposed candidates is to be selected. For example, the client can use local event information specific to the client, such as buffer length, knowledge of local error events, and historical client viewing information to make the final streaming decision.

The client then makes a request to a content source (e.g., CDN 114) accordingly and obtains video data (e.g., video manifest and/or video data chunks). Thus, the decision logic resident on the client controls the streaming behavior, for example, instructing local streamer logic resident on the client on how to stream content, such as when data is downloaded, where data is to be downloaded from, what data is to be displayed and at what resolution, etc.

In the example of FIG. 1A, the client may also make local decisions based on policies. For example, during streaming, policy changes may occur. As one example, a site that owns the content being streamed may decide that all United States traffic should be routed through two particular CDNs. When a policy change occurs, at any point in time there may be live sessions running on numerous clients. The client logic checks in periodically (e.g., with a policy server) to determine whether the policy under which it made decisions is still the most current policy. If there is a new policy, the local client logic may then react differently. Typically, however, because policies may change rarely, a client will make only a request at a start of a session, and upon obtaining enough information, perform local decision making regarding streaming parameters.

In some embodiments, content management system 108 and content distribution coordinator 112 are operated by the same entity. For example, an online movie streaming service could operate both content management system 108 and content distribution coordinator 112. The content distribution coordinator can also be operated by other entities. For example, content distribution coordinator can be operated by an operator of a CDN. Content distribution coordinator 112 can operate independently of content management system 108 and/or independently of a CDN. As one example, the owner of content distribution coordinator 112 could provide services to multiple content management systems (e.g., that may be associated with different services) and/or multiple CDNs.

Client-Aware Streaming Decision Logic in the Cloud

In the example of FIG. 1A, the client is configured with logic to perform streaming decisions. Given the heterogeneity of devices (e.g., of different types, manufacture, etc.), updating of the decision logic can be challenging. For example, because the schedules at which these client devices, applications, libraries, etc. are updated are not controlled by a single entity, updates may be performed inconsistently and at disparate times. Thus, the ability to make fast, iterative changes may be limited in such an ecosystem.

As will be described in the context of the embodiment shown in FIG. 1B and in further detail below, by moving decision making off of the client, decision making logic can be updated more easily. Clients can also operate more efficiently, as the burden of making streaming decisions is moved off the client, thereby reducing the computational processing required to be performed by clients. In such a scenario, the clients can be implemented as thin clients with a minimal logic footprint. More optimal, targeted streaming decisions can also be determined by the backend, as information obtained from other clients can be integrated at a single point with local information specific to a client when making streaming decisions. In addition, running streaming decision logic in a remote server backend/cloud allows the use of multiple versions of decision logic, where the most appropriate/optimal logic can be selected per client device, network connectivity, content type, etc. This provides additional flexibility as compared to the scenario of FIG. 1A, where clients are configured with local, "hard-coded" streaming logic.

FIG. 1B illustrates an example embodiment of an environment in which cloud-based video playback streaming decision-making is performed.

In this example environment, in contrast to the environment of FIG. 1A, a bulk of the streaming decision logic is moved over from the client to a cloud-based system, which can be implemented as a distributed system at the edge of a network. Deploying the streaming decision closer to the edge of the network with proximity to end users allows for low-latency decision making, while providing a powerful, flexible, and upgradeable control plane.

In the example shown, suppose that a user of client device 152 wishes to watch a video using player application 154. The user begins a video streaming session (e.g., by hitting "play" on a selected video). Player application 154 connects to content management system 158 (e.g., via one or more networks 160) and requests the content.

Content distribution coordinator 162 is then contacted to provide instructions to client 152 for obtaining the requested content. In this example, the content distribution coordinator is a decision server that is a cloud-based system and solution for making real-time decisions (e.g., determining a content source and/or bitrate) for optimal video streaming quality both at the start of a video streaming session and during playback.

In this example, the content distribution coordinator includes virtual streamer aware decision logic 164. The virtual streamer aware decision logic is configured to generate instructions associated with content distribution that are to be sent to the client. In some embodiments, the virtual streamer aware decision logic is configured to make decisions on a per-client, per-session basis, for example, making control plane decisions for a particular streaming session using a particular type of streamer on a particular client. In some embodiments, the virtual streamer aware decision logic is configured to use client-specific logic to make decisions using local state information specific to the context of an individual client streamer. The local client state information can include information regarding the current state of a content player, such as its current bitrate, CDN, player state (e.g., playing, buffering, pause, stopped), player buffer length, play head time/position, bandwidth measurement estimations, frame rate, etc. Summary information associated with client state changes can also be generated (e.g., sliding windows of measurements, historical information about the player such as various events, etc.).

In the example shown, the virtual streamer aware decision logic, in addition to using local client state information, is configured to use global shared data when making a decision. In some embodiments, the global shared data, as one example, is obtained from a global intelligence system which is configured to accumulate shared quality of experience (QoE) data from other similar clients.

In some embodiments, the client-specific logic, in conjunction with the global data, is used to facilitate decision making on a per-client, per-session, per-chunk granularity. In order to facilitate such precision in decision making, the content distribution coordinator is configured to collect fine grain local information from the clients requesting content.

The information collected from the client can also include multi-dimensional client attribute information, such as device type, video protocol type, streamer type, asset type, user agent, custom tags, session identifiers, etc. Other information specific to the client, such as buffer length, buffer state, bandwidth of the client, etc. can be collected. Event information such as indications of download errors, rebuffering, etc. experienced by the client can be collected. Chunk information can also be collected, such as the bitrate of a current chunk that is being downloaded, the time spent downloading the current chunk (and other chunks), as well as chunk processing historical information. Other information, such as user behavior and viewing history can also be collected. The information collected from the client can also include performance information (e.g., Quality of Experience (QoE) information) while monitoring video streaming sessions, which can also be added to the pool of global shared data. The information collected by the client can be transmitted to the backend using heartbeat messages.

The CDC is configured to use the fine grain information specific to the client, in combination with the global data, to determine a set of streaming instructions optimized for the particular streaming session requested by the particular client. For example, if a requesting client has the attributes that it operates on the iOS® operating system and the streamer is for the ESPN® app, similar clients to the requesting client can be identified from the global shared data. The local client state information (e.g., client history metrics, event information, buffering state/conditions, etc.) can then be used in conjunction with the global shared data to determine the optimal instructions for the specific requesting client. Different instructions may be sent for a different client with different attributes (e.g., Amazon® Fire Phone running the HBO® streaming app) and different local client states.

Having the fine grain local information provides the CDC with much more detailed visibility and information regarding a particular client when making a decision for a specific client's session. The CDC can determine instructions for indicating whether a switch in CDN and/or bitrate should be made, (i.e., switch or no switch) and if so, when (i.e., scheduling of when chunks should be downloaded, such as on the next chunk boundary, immediately, etc.).

The instructions are then transmitted from the CDC to the client. In this example, rather than including logic to perform local, final decision making using information provided by the CDC, as in FIG. 1A, the client is a thin client that includes logic for enforcing the instructions generated by the CDC. As a thin client, player application 154 includes minimal, lightweight logic to perform the decision enforcement, as well as data monitoring and collection of fine grain data as described above, and failover processing (e.g., in the event that instructions cannot be received by the client).

Throughout the course of a session, the client continues to send fine grain local information to the CDC, which may update its instructions based on the real-time, local state information of the requesting client, as well as the information aggregated from other clients. If the CDC determines that a change to the client's streaming session should be made, the instructions to the client are updated, and the updated instructions to the client are updated.

As will be described in further detail below, in some embodiments, as the CDC can make fine grain decisions that are specific to a particular session of a particular client, decisions can be made on a chunk-level granularity. For example, the CDC, for each chunk that a client is to play, can make a decision on the source of the chunks and/or the bitrate of the chunks. Thus, the CDC can generate instructions for the client to switch chunk sources (e.g., at the boundary of the next chunk or to drop the current chunk and make a mid-chunk switch) or to continue as is and make no changes.

As the CDC makes streaming decisions regarding content source and/or bitrate, where the client is reliant on those decisions made by the CDC, in some embodiments, failover logic is implemented on the client in the event that the client is unable to receive instructions from the CDC (e.g., because of network connectivity issues, the CDC being unavailable, etc.). Further details regarding client failover logic will be described below.

As described in the example environment of FIG. 1B, as the optimization of video streaming (e.g., selection of CDN and/or bitrate) is performed by the backend, the client can be configured as a thin client, which, for example, collects local client state information and enforces/executes the instructions determined/provided by the backend. This reduces the resources required by the client, as it is no longer required to perform optimization/processing to determine video streaming parameters. Thus, the client can operate more efficiently, with a reduced burden on computational/processing resources.

Additionally, as the decision making logic is implemented on a centralized backend decision server, rather than on individual, disparate clients, upgrading of the decision server's virtual streamer-aware module can occur seamlessly. For example, upgrading can occur every time that a new video session plays, thereby reducing the burden of upgrade complexity in the face of video device heterogeneity.

Further, by moving the bulk of the decision making functionality from the client device, of which there may be numerous various types, to a centralized location on a backend allows for an increase in the capabilities of the backend control plane system. For example, the control plane can be iteratively improved and measured, without being dependent upon the updating schedules of client decision logic (which may be subject to restrictions/limitations imposed by manufacturers of client devices). Additionally, data can be easily shared across various different device workflows.

Described below are further details regarding a system for virtual hosting of client-aware streaming decision logic in the cloud. As will be described in further detail below, the system facilitates the performance of adaptive multi-bitrate (MBR) selection in the cloud, as well as multi-content delivery network (CDN) selection in the cloud. Techniques for optimization of communication between clients and backends in such an environment to facilitate streaming decision making in the cloud will also be described in further detail below.

Client

Figure 2:
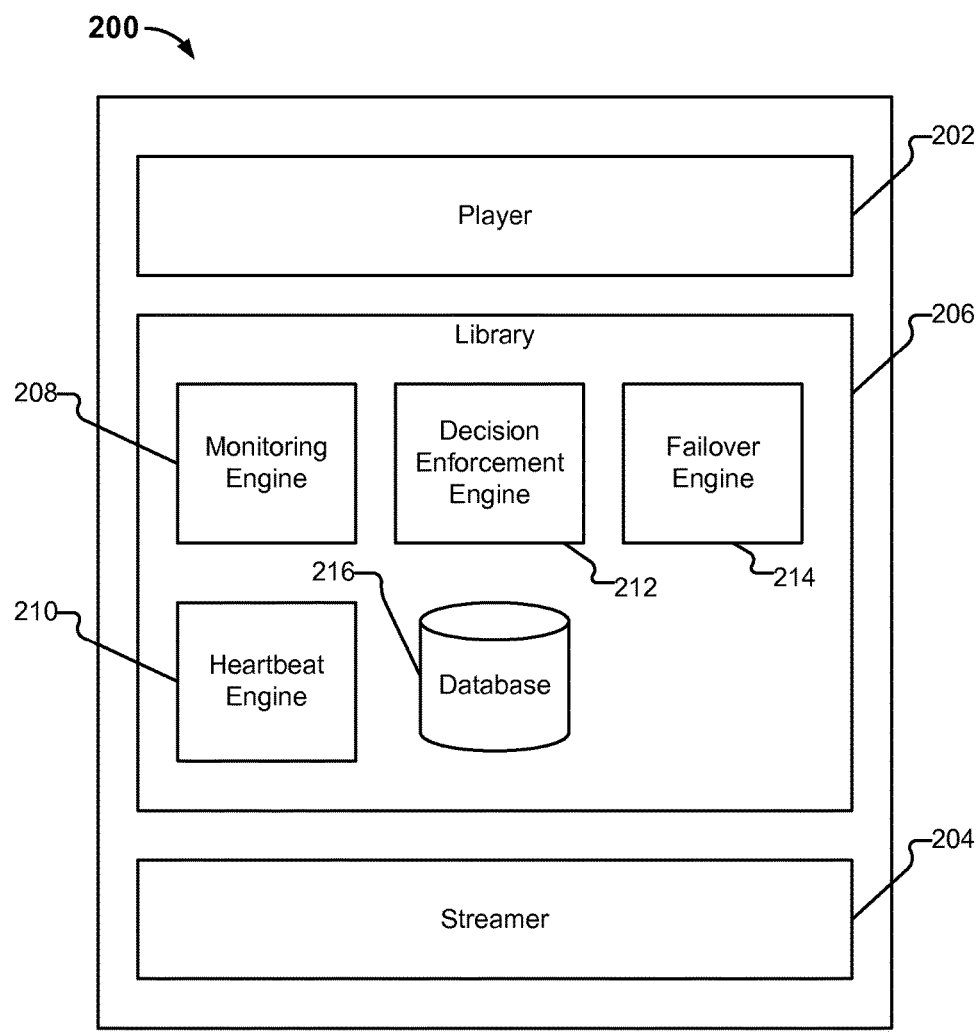
FIG. 2 is a block diagram illustrating an embodiment of a client device.

FIG. 2 is a block diagram illustrating an embodiment of a client device. In some embodiments, client device 200 is an example of client device 152 of FIG. 1B. In this example, client device 200 includes player 202, streamer 204, and library 206. Library 206 further includes monitoring engine 208, heartbeat engine 210, decision enforcement engine 212, failover engine 214, and database 216. In this example, the client is a thin client that includes minimal logic that is configured to monitor streaming sessions, enforce decisions made by a backend, and provide failover in the absence of a control plane.

Player 202 is a portion of a client device application and is configured to provide controls for controlling playing of a video stream. For example, the player facilitates/supports the controls of a user interface (UI) that an end user interacts with. In some embodiments, the player is a portion of a client application or agent that provides UI controls with which users interact. The player is also configured to render streaming content.

Streamer 204 is configured to stream actual video data. In some embodiments, the streamer is implemented using a set of libraries and code that communicate with and download data (e.g., video chunks) from a content source (e.g., a CDN), implementing a portion of the data plane of video streaming. In some embodiments, the streamer cooperates with content sources to optimize usage of a streaming buffer.

Library 206 is a library of various elements. The elements can include UI elements as well control plane elements. The library also includes various elements for monitoring the player/streamer, sending heartbeat information to a backend such as content distribution coordinator 162 of FIG. 1B, enforcing decisions/instructions generated by the backend, and facilitating failover in the event that instructions are not received. In some embodiments, the logic provided by the library is used to issue commands to other components of the client, such as the streamer (e.g., to instruct the streamer to obtain content according to the decisions made by the backend). The elements instantiated by the library will be described in further detail below.

Monitoring engine 208 is configured to monitor the streaming of data on a client. This can include monitoring the status (e.g., local state) of a player (e.g., 202) and/or streamer (e.g., streamer 204) resident on the client. In some embodiments, for each streaming session, the monitoring engine instantiates/creates a new session monitor to locally monitor a given streaming session. In some embodiments, the monitoring engine/module is instantiated by library 206.

Various events can be monitored by the monitoring engine, such as the amount of time taken to start a video. Play event information can also be monitored, as well as viewer behavior information (e.g., pausing of video, playing of video, stopping of video, etc.). Download failure events (e.g., of failure to download chunks) or other error events can also be monitored and recorded. Information associated with a playback buffer can also be monitored, such as a required amount of buffering, whether a re-buffering condition exists, the buffer length/capacity of the playback buffer, the buffer's current capacity, whether the buffer is empty, etc.

A history of a session can also be monitored. For example, a monitored session can be tracked periodically to generate a history of the streaming session. Information such as the amount of time that has been spent downloading content, the number of bytes downloaded from a particular source, etc. can be monitored and recorded. The streaming session information can also include information associated with a downloading and processing of video chunks (individually or collectively). The chunk-level information that is tracked can include, for example, events such as each time a chunk starts downloading, a chunk completes downloading, etc. Any other appropriate fine grain chunk information can be collected and monitored.

The collected/monitored information can include client history information. For example, a history of the videos that were previously watched on a client (e.g., ten videos over the last seven days), the highest bitrate that was achieved over a span of time (e.g., the highest bitrate that a client streamed content at was four megabytes over a seven day period), etc. can be monitored. The client history information can be aggregated over a period of time (e.g., seven days) and can include client state and historical information. For example, the monitoring engine can be configured to generate sliding windows of segment download info, average download bandwidth, frame rate measurements, etc. Other historical information can include a history of the bit-rates played so far (and the playing time and buffering time for each one), all of the CDNs used so far (and the playing time, buffering time, and errors for each one), as well as any other appropriate historical information, such as about user interactions (e.g., seeking forward, seeking backward, etc.).

The information associated with the client that is monitored/collected can also include multi-dimensional client information. The following is an example of the attributes in a set of multi-dimensional client information:

Device Type (e.g., mobile, set-top box, gaming console, etc.)

Video Protocol Type (e.g., HLS, Smooth Streaming, HDS, etc.)

Streamer Type (e.g., Native Android streamer, NexStreaming streamer, etc. for Android; MPMoviePlayer or AV Foundation streamer for iOS, etc.)

Asset Type (e.g., ONDEMAND, LINEAR_LIVE, LIVE_EVENT, etc.)

HTTP user-agent of the content-playing device

Custom tags can also be sent (which may vary based on customer integration)

As the data collected may be on a per-session/stream basis, each heartbeat can also be associated with a corresponding session identifier (ID).

Other attribute information associated with the client, such as the client's local network conditions, the client's last mile connection, etc. can also be collected.

In some embodiments, the monitoring engine is configured to generate metrics or any other appropriate measures based on the observed data, as well as perform analytics and statistical analysis on aggregated client data (e.g., determining an average streaming bandwidth over a period of seven days, aggregating the number of download errors experienced over a period of time, etc.).

As will be described below, the collected information is packaged into heartbeat messages which are transmitted to a backend such as a content distribution coordinator. The backend is configured to store the client information (e.g., in a persistence layer), thus resulting in the backend having per client history information that is aggregated over time. This collected information can be used by the backend to make decisions on a per client/session/chunk basis, with decisions tailored to the specific client based in part on its local client state.

Heartbeat engine 210 is configured to generate heartbeat messages. In some embodiments, a "heartbeat" message refers to a package/payload of information that is sent from the client to the backend.

As described above, in some embodiments, a monitoring engine is configured to monitor the streaming status of a client. The heartbeat engine, when generating heartbeat messages, batches the collected information into heartbeat messages which are transmitted to the backend such as CDC 162 of FIG. 1B (e.g., over a network). As will be described in further detail below, in some embodiments, the backend, is configured to process and use the local client state information to make streaming decisions on behalf of the client, which are sent back to the client to be enforced.

In some embodiments, the amount of information included in a heartbeat and/or the frequency of heartbeat transmissions is optimized such that the heartbeat control plane data is not a significant percentage of the data plane (whose bandwidth is used to communicate actual video data). The size of the heartbeat can be dynamically adjusted, for example, to reoptimize the usage of network bandwidth. In some embodiments, adjustment of the transmission parameters of the heartbeat is made by a backend such as the CDC, which sends instructions for controlling the generation and output of heartbeats. In some embodiments, the data that is batched into a heartbeat includes summarized data, (e.g., metrics/measures aggregated over a period of time).

The batching can be performed synchronously, for example periodically or any other appropriate time driven basis. In some embodiments, the batching and generation of a heartbeat can be performed asynchronously, for example, in response to a request by the CDC for client state information.

In some embodiments, heartbeats are generated and transmitted according to a protocol, such as a packet format running on top of standard HTTP POSTs (or any other appropriate application layer protocol).

As the streaming decision logic resides primarily on the backend, rather than the client, the information collected from the client can be transmitted as frequently as needed by the backend to make the decision for the client. In some embodiments, the backend is configured to generate a decision for every heartbeat. The heartbeat engine can be configured to send a heartbeat for each chunk to be downloaded.

Decision enforcement engine 212 is configured to enforce decisions/instructions made by/received from a backend such as a content distribution coordinator. As the instructions are based on decisions made by the backend, and actual playback/rendering is occurring locally at the device, any decision must be implemented locally at the client. Thus, the client includes enforcement logic to locally implement decisions that have been made by a remote entity.

The decision enforcement engine is configured to receive streaming instructions from a backend. As will be described in further detail below, the instructions can include chunk-downloading instructions, indicating, for example, whether a switch in content source and/or bitrate should be made, and if so, when the switch is to be made (e.g., at the next chunk boundary, immediately, etc.). The decision enforcement engine is configured to enforce the instructions/decision by causing data/content to be obtained in accordance with the instructions.

In some embodiments, the decision enforcement engine enforces the instructions by controlling (e.g., via instructions) various components of the client player/streamer. For example, the decision enforcement engine can be configured to take-over or otherwise control the streamer, to enforce any session changes. For example, the decision enforcement engine can provide instructions to the streamer to perform particular actions at certain points in time (e.g., making a switch in CDN (with a different URL) at the next boundary if so indicated in instructions received from the backend).

Failover engine 214 is configured to provide failover logic. The failover engine is configured to maintain control in the event of failover, for example, when the client is unable to communicate with the backend for instructions on what actions to take (e.g., in the event that instructions from a backend cannot be received, or the backend fails to respond to communication attempts by the client). The failover module provides basic intelligence in the event that the control plane is not available so that the client can continue to stream even without the instructions and decisions made by a backend.

In some embodiments, a failover mode is entered in the event that the client sends heartbeats, but does not receive any responses after a period of time or a number of heartbeat attempts (e.g., 10 seconds with no response, or no response after two heartbeats).

Upon entering failover mode, the failover engine is configured to gracefully migrate playback from a normal mode (where the backend provides instructions) to a mode that can continue to stream data independently of the backend. For example, in some embodiments, the backup failover mode reverts to an existing streaming mechanism that can operate independently of the backend (but does not benefit from the optimization and decision-making performed by the backend).

The following is an example of processing that can be performed when a failover mode is entered. When a user wishes to view a video stream (e.g., when the user presses "play" in a content player), a request is made to a headend or content management system (CMS) (oftentimes a customer premise or CDN entity) for the video stream of interest (which may be identified using an identifier). The CMS/headend provides initial meta information about the video of interest, for example, providing an initial universal resource locator (URL) for a CDN from which the client can start streaming the requested content. If the backend integration (e.g., CDC 162 of FIG. 1B) is present, this initial, default URL is replaced or otherwise modified with a new CDN URL (e.g., because the backend has decided that another CDN and/or bitrate is optimal for streaming for the requesting client) and sends corresponding instructions to the client to obtain content from the new CDN. If the backend is not available, then the failover handling process occurs, and the default CDN is used instead, allowing the client to continue playback while waiting for the backend optimization to be re-established.

In some embodiments, during the failover mode, the client continues to send heartbeats to the backend, for example, in the event that the backend becomes accessible. For example, the client can continue to attempt to send heartbeats to the backend at a previously specified heartbeat interval.

The client may exit failover mode in response to the client receiving instructions from the backend again. Once a response is returned from the backend, the fallback mode is exited, and the client returns to a normal mode of operation in which streaming decision instructions/commands are received from the backend and enforced at the client.

In some embodiments, the heartbeats sent to the backend are configured to include information indicating that a failover mode was entered. The information can be utilized by the backend when making further decisions (e.g., stored as global intelligence information and/or local information about the particular client that entered failover mode).

The following is an example scenario illustrating how the various components of client device 200 interact with each other. In this example, the streamer establishes a connection (e.g., HTTP connection) with a CDN and downloads video data. The downloaded data is then sent to the player, which then renders the data (i.e., video playback). The monitoring engine is configured, for each video session, to create a new session monitor. The session monitor monitors the particular video streaming session. Examples of session information that is monitored include the time that the video session starts, the events that are occurring during the session, the amount of time that it took to start the video, etc. Other quality metrics, such as rebuffering, can also be monitored. For example, when streaming a video, the client has a buffer of finite memory to which actual video data (e.g., data bytes) is downloaded from a content source (e.g., CDN producing/providing the content). A video renderer is configured to consume the video data from the buffer.

In some embodiments, generating an optimal streaming decision by the backend is based at least in part on optimizing utilization of a client buffer, referred to also as a "playback buffer," for example, to prevent the buffer from being empty. An empty buffer can be an indication that an insufficient amount of video data has been received from a content source, and thus there is nothing to display/render. In such a situation, the player is in a buffering state, where an end user is waiting for a video to load. Thus, the streamer communicates with a content source to optimally utilize the memory buffer such that there is sufficient data. The buffer is used as there may be variability in delivery of content (e.g., variability in a network). However, the size of the buffer is configured to not be too large, for example, to prevent delays in when the video can begin rendering, where rendering is not triggered until the buffer is full.

As data chunks are downloaded by a client, the streamer on the client collects fine grain information regarding every chunk, such as when the download of the file started, how long the downloading of the video file took, how many chunk headers were processed, what was the roundtrip for a chunk request to receipt of the chunk, the distribution of the chunks, etc. This collected chunk information is then sent to a backend, which is configured to use the information to make streaming decisions. An example of a decision is what source (e.g., content delivery network) should the client retrieve video chunks from.

The variability in the performance of the chunk downloading from various CDNs has an impact on how the playback buffer should be optimally utilized, as described above. Thus, for example, collected information about chunk downloading from different CDNs and its impact on the playback buffer (which can be used as an indication of a quality of a stream) can be used by the backend to compare CDNs and determine the appropriate CDN to provide a particular chunk of video data at a particular point in time.

As described above, with the bulk of streaming decision logic (e.g., regarding CDN and bitrate selection) residing on a remote backend, the client can be configured as a thin client with a minimal set of features, functionality, and capabilities.

Content Distribution Coordinator

Figure 3:
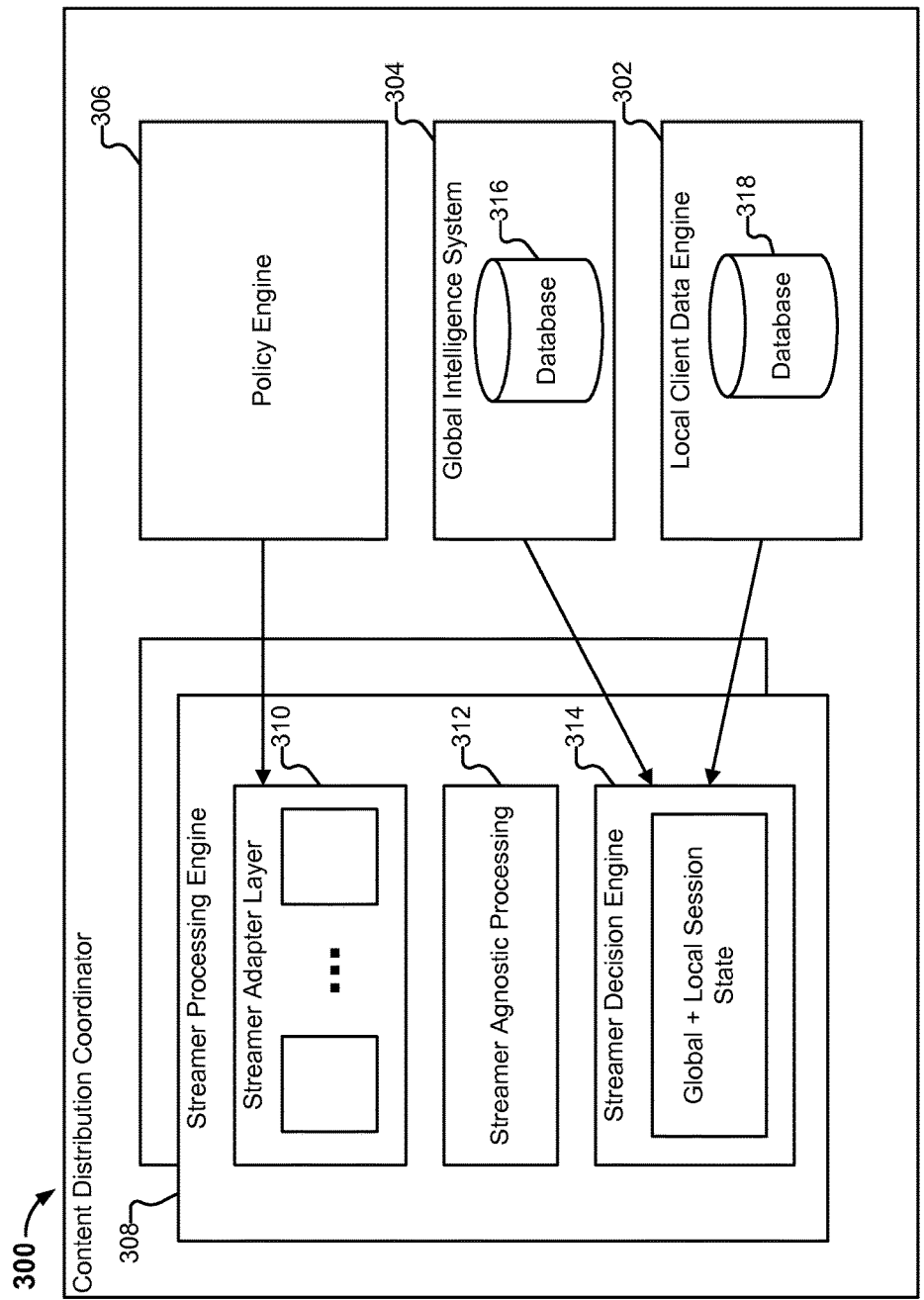
FIG. 3 is a block diagram illustrating an embodiment of a content distribution coordinator.

FIG. 3 is a block diagram illustrating an embodiment of a content distribution coordinator. In some embodiments, content distribution coordinator 300 is an example of content distribution coordinator 162 of FIG. 1B, and the various components of content distribution coordinator 300 described below are used to implement the functionality of the content distribution coordinator such as that provided by virtual streamer aware decision logic 164 of content distribution coordinator 162 of FIG. 1B. In this example, content distribution coordinator 300 includes local client data engine 302, global intelligence system 304, policy engine 306, and streamer processing engine 308. Streamer processing engine 308 further includes adapter layer 310, streamer agnostic processing 312, and streamer decision engine 314. Global intelligence system 304 further includes database 316. Local client data engine 302 further includes database 318.

In some embodiments, content distribution coordinator (CDC) 300 is a cloud-based system and solution for making real-time decisions for optimal video streaming quality both at the start of a video and during playback of a video.

The CDC is configured to use client specific logic as well as global shared data across other similar views. The global shared data is maintained by the global intelligence system, which is configured to accumulate shared Quality of Experience (QoE) data from other similar clients.

As will be described in further detail below, in some embodiments, the content distribution coordinator backend supports deployment of highly-customizable client adaptor modules in the cloud to optimize the viewing experience on a specific device and/or integration (e.g., specific combination of client characteristics, such as device type, operating system type, application used to stream content, etc.).

As the decision logic is hosted in the cloud, rather than on individual clients, the updating of the decision server's streamer processing can be performed seamlessly and on-demand, for example, each time a new video session plays, thereby reducing the burden of upgrade complexity in the face of video device heterogeneity.

Local client data engine 302 is configured to process local client information. In some embodiments, processing the local client information includes processing heartbeats received from clients. As described above, the heartbeat messages can include local client state information, state information associated with particular streaming sessions, client historical information, and/or as multi-dimensional attribute information associated with a client. In some embodiments, the local client data engine is configured to summarize/aggregate data obtained from the client.

In some embodiments, the local client data engine is configured to extract the information from the heartbeat messages. In some embodiments, the local client data engine infers data associated with the client, such as its Internet Protocol (IP) address, geolocation/location attributes (e.g., city, state, country, ASN, ISP, zip-code, etc.), etc.

The extracted/inferred information is then stored, for example, in a persistence layer (e.g., in database 318). The client information can be stored/indexed on a per-client and/or per-session basis. For example, the data store can have records corresponding to each unique client, as well as records for each of the streaming sessions associated with the client (e.g., played by the client). The records can include session state information associated with a particular streaming session, such as a history of events (e.g., playback errors, rebuffering, etc.) that occurred during the particular streaming session. The records can also include local historical information associated with a client, such as the number of content items streamed by the client, what those content items were, when the content items were played, etc. User behavior monitored by the client can also be stored.

In some embodiments, per-client records generated for a particular client include an identifier for the client, as well as an identifier for the video sessions requested/played by the client.

The per-client data store records can also include client local state information, and current client measurements (e.g., real-time, per-client state). In various embodiments, the client local states and current client measurements include current bitrate, current CDN, current player state (e.g., playing, buffering, paused, stopped, etc.), current player buffer length, current play head time/position, current bandwidth measurement estimations, and current frame rate.

The per-client data store records can also include a summary of state changes associated with a particular client. For example, a record can store, for a particular client, all of the bitrates played so far (as well as the playing time and buffering time for each of the bitrates), all of the CDNs used so far (as well as the playing time, buffering time, and error events associated for each of the CDNs), a sliding window of segment download information (e.g., start time, end time, duration, bytes), a sliding window of average download bandwidth, a sliding window of frame rate measurements, and other historical information associated with user interactions (e.g., seeking forward, seeking backward, etc.). The summary of state changes can be generated by the local client data engine 302 (e.g., using state information and measurements obtained from the client). In other embodiments, the summary/aggregated information is generated by a requesting client such as client 200 of FIG. 2.

Thus, per-client/session records generated for a client can be maintained by the backend, which can, for example, be used in future streaming decisions for a session for the particular client. The information associated with the client can be aggregated over a time duration, and stored along a time dimension. The per-client records can also be updated over time/dynamically, as new client local state and other client-specific information is received (e.g., via heartbeats). As will be described in further detail below, the specific client/session information can be used to make streaming decisions that are targeted for the specific context of a particular client/streaming session.

In some embodiments, the local client data engine is configured to provide instructions for controlling communication of heartbeats. For example, the local client data engine can instruct the client to adjust its heartbeat interval (e.g., longer or shorter frequency/time period). The instructions can be generated dynamically, based on a variety of criteria, an evaluation of the data received, heartbeat control policy/protocol, etc. For example, if a sufficient/threshold amount of information has been received, the client can be instructed to reduce the frequency at which heartbeats are sent. As another example, if an evaluation of client performance data over a time window indicates that the client has been experiencing good performance (or performance that exceeds a threshold) over the time window (or any other appropriate threshold), the client can be instructed to reduce the heartbeat frequency. As another example, if the client has been determined to be experiencing playback issues, the client can be instructed to report heartbeats more frequently in order for the backend to more closely monitor changes in the status of the client.

The heartbeat instructions can be determined on a per-session/stream basis/level. For example, while one streaming session for a client may be doing well and is instructed to reduce its heartbeat interval accordingly, another streaming session playing on the same client that is suffering from playback issues can be separately instructed to increase heartbeat frequency (or maintain a certain level of heartbeat frequency) so that the backend can more closely monitor the suffering streaming session. Thus, heartbeat communication control can be dynamically exercised for a particular stream or session.

Global intelligence system 304 is configured to generate a global view of performance across nodes (e.g., client players, content sources such as CDNs, etc.). The global view is generated using information aggregated from various clients, content sources, and other nodes in a content distribution environment. For example, data can be extracted/inferred from client heartbeats received from numerous nodes. Data can also be aggregated/captured from nodes by polling various clients and resources for shared event information.

The information can include telemetry/performance information, such as Quality of Experience (QoE) data. The global intelligence information can include global history information as well as global shared data. The global information aggregated from the various client nodes, content sources, etc. can include information related to different bitrates/resolutions of streaming content, etc. In some embodiments, data collected from clients can be aggregated across various dimensions, such as geolocation, device type, operating system platform, streamer type, ASN, or any other appropriate attributes. The aggregated/collected data can then be stored, for example, to a data store. In some embodiments, the aggregated information is anonymized and stored in a pool of community performance data (e.g., in database 316).

In some embodiments, the global shared data is a knowledge base that is built using the data aggregated across multiple devices. The global shared data can be used to generate a multi-dimensional map that is updated in real-time as more information is collected from various nodes.

The aggregated information can be evaluated, for example, using analytics processing and statistical analysis, to determine a global snapshot for all clients being monitored. As will be described in further detail below, the global information is used as input when generating streaming decisions/instructions. For example, when a request to make a decision for a particular client is received by the global intelligence system, the attributes (e.g., multi-dimensional client information) of the particular requesting client can be used to partition/filter the global information to identify clients similar or otherwise correlated to the particular client. For example, the requesting client can be classified by attributes such as ASN, the CDN from which it is receiving data, geographic attributes (e.g., DMZ code, city, or state), etc. A set of clients sharing similar attributes (e.g., ASN and a geographic region) can then be identified. The aggregate quality/performance for the clients in the determined partition can be computed. Such computed information can then be used (e.g., by streamer decision engine 314, described in further detail below) in conjunction with the local state information associated with the requesting client (e.g., received from the requesting client and stored in the record in per-client data store 318 that corresponds to the requesting client) to generate a streaming decision of an appropriate content source and/or bitrate.

As one example, suppose that a new provider has a new streaming app that is being brought online. Upon startup, data collected from clients using the new app to stream content can be collected and aggregated and added to the global shared data. This data can then be used to evaluate the performance of clients with those specific dimensions to provide targeted chunk downloading instructions. For example, based on an evaluation of the global shared data for clients using the new streaming app, the backend can determine that iOS® traffic has superior performance on one CDN such as Level3® as compared to Akamai®. New client streaming sessions opened using the new app can then be instructed to obtain data from the CDN with superior performance.

Streamer processing engine 308 is configured to process streaming requests and determine a set of instructions to provide to the requesting streamers. In some embodiments, the streamer processing engine is implemented using a modular, distributed architecture. The various elements of the streamer processing engine are described below.

Streamer adapter layer 310 is configured to provide adaptors. In some embodiments, the adaptors are configured to facilitate processing appropriate to the attributes/characteristics/context of a requesting client streamer. In some embodiments, the adaptors are implemented as plugin modules, where multiple instances of adaptors may be executed and run by the streamer processing engine.

For example, different client streamers may have different attributes/types, such as operating system type, application type, streamer type, streaming protocol, device type, customer, etc. Different types of processing and information may need to be performed/obtained that are relevant/appropriate to a particular requesting streamer.

In some embodiments, each adaptor maps to each type of streamer integration that is encountered. A plugin may correspond to a particular set/combination of client/streamer attributes. For example, one plugin may correspond to streamers on clients running the iOS® operating system, on the iPhone® 6, streaming using the HBO® app, while a different adaptor plugin may correspond to streamers on the Amazon Fire Phone®, streaming using the ESPN® app. Adaptors corresponding to any other appropriate contexts, dimensions, or types of streamers with which the content distribution coordinator can be integrated can be implemented.

In some embodiments, when a request to stream content or a heartbeat is received from a client, the multi-dimensional client attributes associated with the client/streamer are used to identify an appropriate adaptor. The identified adaptor is then used to facilitate the relevant processing/workflow appropriate to the requesting client streamer. As described above, different types of streamers may require different types of processing, potentially resulting in different decisions being made for different types of streamers.

As one example, different types of streaming policies may be enforced depending on the type/attributes of a requesting client streamer. In some embodiments, an identified adaptor is configured to obtain a particular corresponding set of policies. The policies can be obtained from a server or data store such as policy engine 306, which is configured to maintain streaming policies.

The policies include policies that define various streaming decision parameters. For example, a customer such as HBO® may define a policy that indicates that for iOS® devices using the HBO® streaming app, only certain CDNs and bitrates should be used. As another example, iOS® devices may only be able to support the HLS protocol, where the HLS protocol may have certain built-in requirements that must be adhered to. Thus, one decision that applies to iOS® devices may not apply equally to another device, such as a Microsoft® XBOX, which uses the Microsoft's® smooth streaming protocol. The policies can be used to facilitate in determining streaming decisions appropriate for the particular requesting client.

For example, if a heartbeat is received from an instance of HBO's® iOS® app on a requesting client, then the corresponding adaptor is identified, which retrieves the appropriate corresponding policy. Thus, only the CDNs and bitrates specified in the obtained corresponding policy will be used for the requesting client. A different customer may have a different policy that will be applied for different requesting clients (e.g., ESPN® iOS® app policy will be different from HBO® iOS® app policy).

Thus, the flexibility of the architecture of the streaming processing engine and the adaptor layer allows any type of multi-dimensional client streamer entity to be supported and integrated with the content distribution coordinator. As described above, the various dimensions include different device types, different operating systems, etc. In this example, each adaptor is associated with a particular client context profile (that includes different combination dimensions). In some embodiments, custom profiles can be created/configured (e.g., by customers of the platform via a web interface or any other appropriate interface) to define adaptors.

As the adaptors can be implemented as standalone, independent plugin modules, each of the adaptors can be updated individually, without affecting the performance of other adaptors. For example, suppose that a library for a particular type of device is updated—only the specific adaptor(s) that are affected by the library for the particular type of device need to be updated.

Streamer agnostic processing engine 312 is configured to perform general processing that is applicable to all clients/streamers of any type. The client/streamer agnostic processing includes client processing that is performed regardless of the integration type of streamer. The common processing can include monitoring a streaming session as well as generating/computing metrics (e.g., QoE metrics) common to all streamers. The streamer agnostic processing engine can be implemented logically as a common layer.

Streamer decision engine 314 is configured to generate streaming decisions on behalf of a client. The streamer decision engine is configured to use global and local session state information to generate the decisions. In some embodiments, the global and local session state information are obtained from global intelligence system 304 and local client data engine 302, respectively. The streaming decision includes a determination of an appropriate content source (e.g., CDN) and/or bitrate for the chunks that a streaming client is to be instructed to download. Streaming instructions based on the determination are then provided to the client to be executed (e.g., by decision enforcement engine 212 of FIG. 2).

The streamer decision engine can be configured to utilize local client state information in conjunction with global shared data when generating a decision. By maintaining both the local states of individual clients along with globally shared data of the various clients consuming content and merging them together when performing streaming decision making, fine grain decisions can be made on a per-client, per-session basis. In some embodiments, a new decision can be made for each heartbeat received from a client. The decisions can be made at a chunk-level granularity, where the streamer decision engine performs a new determination of content source and/or bitrate for a next/subsequent chunk to be downloaded. Thus, for example, if a client is playing multiple streams, different decisions can potentially be made for each of the chunks being played in the different streams.

As one example of the processing performed in generating a decision, suppose that a heartbeat is received from a client. In response to receiving the heartbeat, the multi-dimensional attributes of the requesting client are extracted from the heartbeat. The attributes are used to identify a particular adaptor (e.g., in streamer adapter layer 310), which in turn obtains a policy (e.g., from policy engine 306) appropriate to the context of the requesting client. The content distribution coordinator then uses the policy, local state information, and global state information to make a determination of an optimal content source and/or bitrate for a chunk to be downloaded by the requesting client.

In some embodiments, the attributes of the client are used (e.g., by the global intelligence system) to partition the global shared data aggregated from numerous clients/nodes to identify a set of clients correlated to the requesting client. The performance information associated with the clients is evaluated to determine a set of candidate options for content source and/or bitrate (e.g., for a video chunk to be downloaded by the client).

The local client state information corresponding to the particular requesting client is then used to make a final decision/selection from the set of candidate options of an optimal solution for the content source and/or bitrate for the requesting client's streaming session. Rules established by obtained policies can also be used in making the determination. In some embodiments, chunk information, such as roundtrip latencies, error events, frame rate issues, etc. can also be used when making the streaming decision.

In some embodiments, the set of instructions is determined by optimizing the use of a client buffer, for example, to prevent buffering or re-buffering. For example, the streamer decision engine can determine, using global shared data, a set of candidate bitrates and/or content sources based on the performance of other clients identified as similar (or otherwise correlated) to a requesting client. The client's local state information, such as its current bandwidth, buffer length, etc. can be used by the streamer decision engine to determine which of the candidate bitrates and/or content to provide in instructions to the requesting client.

The instructions generated based on the decision making by the streamer decision engine are provided to the requesting client, which is configured to execute the instructions and enforce the decision made by the streamer decision engine (e.g., where a chunk is downloaded according to the streaming decision in the instructions).

Various types of decisions with different parameters/conditions can be generated. For example, the streamer decision engine can be configured to determine whether a switch in content source and/or bitrate should be made for the next chunk. A decision can also be made regarding when the switch/change should go into effect. For example, the client can be sent instructions to: make the switch immediately (and stop whatever downloading is currently in progress); wait a certain amount of time before making the switch; to stay with the current stream (e.g., current CDN and/or bitrate), etc. The instructions can also define a switching point on a chunk-by-chunk basis, for example, to drop the current chunk being downloaded and switch to the new chunk immediately, switch at the next chunk boundary between downloading chunks, or to continue with chunks from a current CDN and/or bitrate (and not make a switch). Thus, the streamer decision engine can determine whether a switch should be made, and if so, when a switch should be made, and instruct the client accordingly. In some embodiments, the instructions include a chunk URL for the next chunk to be played by the streamer (where the chunk URL is for a chunk that corresponds to a determined content source and/or bitrate). Example scenarios involving different chunk downloading instructions will be provided in further detail below.

In some embodiments, the decisions/instructions generated by the streamer decision engine are stored (e.g., to the per-client/session records of the requesting client), for example, as historical information. Performance information associated with each of the decisions can also be monitored and associated with the decisions/instructions in client session records.

The decisions made for a client by the streamer decision engine can include initial streaming decisions (e.g., for the start of a video streaming session) as well as midstream decisions (e.g., decisions made while streaming). In some embodiments, the initial streaming decisions are made based on specific and fixed information, such as a requesting of the client's history before the current session and the global data across other similar clients. In some embodiments, the mid-stream decision logic also utilizes both the client's history and the global data, but because decisions are to be made constantly for mid-stream control, various other metrics may be tracked proactively as well, such as playback buffer size. These tracked metrics can be used to arrive at optimized decisions several times during/throughout the life of the streaming session.

Thus, the use of hyper-local client state information in conjunction with global performance information aggregated from multiple clients allows for precise, fine grain streaming decisions that are tailored/targeted to the particular context of a requesting client. Having a single decision point in which the client's multi-dimensional context, local client information, and global shared historical information aggregated from other clients are merged provides a combined model in which a rich data set is used as input in determining a streaming decision.

As one example scenario, suppose that a client requests streaming instructions. Client records can be obtained (e.g., from local client data engine 302) for the particular client. Suppose that the records include historical information for the requesting client indicating that the user associated with the client has watched five videos of a particular streaming service, all of which were streamed from a particular CDN. The average streaming performance of the five videos can be evaluated. The local average performance experienced by the particular requesting client can then be compared to the performance of other similar clients (e.g., in the same geography as the requesting client, having the same device type or streaming app, etc.) identified from global shared data (e.g., obtained from global intelligence system 304). The local and global information can be used to make a decision that is targeted specifically to the context of the requesting client (where the context can be reflected across multiple dimensions such as device type, client operating system, streaming application, etc.). The decisions made by the streamer decision engine can be made for both live and on-demand video streaming, as well as any other appropriate type of audiovisual content streaming.

As another example scenario, optimization of a buffer can be performed to determine what instructions to send, as well as a time at which to execute the instructions. For example, based on an assessment of the buffering state of a client (e.g., by analyzing data received from a client in a heartbeat), the streamer decision engine can predict that a buffering event may occur. An optimal source and/or bitrate can be determined by the streamer decision engine such that the client does not experience rebuffering and any issues in rendering content. Instructions indicating that the switch should be made, and a time to make the switch are then generated and sent to the client to be enforced.

In the above examples with respect to streamer decision engine 314, streamer decision engine 314 is configured to use both local client state information and global shared data together to generate streaming decisions on behalf of a requesting client. In some embodiments, the streamer decision engine can be configured to generate decisions based on either global or local client state information, individually, with the techniques described above adapted accordingly. For example, a decision can be made for a client using only local client state information, without using global shared data. Similarly, streaming decisions can be made using only global shared data, without local state information.

In the content distribution coordinator described above, the CDC backend has complete control over how data is maintained and split. For example, data can be split among various dimensions that can be configured, expanded, and modified over time to include more types of integration (e.g., new devices, new apps, new content, etc. with new adaptors implemented accordingly). New types of factors can be used to make decisions for streaming logic, with updates being made at a centralized backend, rather than across myriad and disparate heterogeneous devices, providing various benefits in efficiency and resource utilization. For example, decision making can be updated on the backend independently of the client devices, which may have technical limitations, or where the manufacturer of a device may impose restrictions on what of the device can be changed/modified. Manufacturers, for example, may dictate that core code cannot be exposed to outside modification, where only a higher level application scripting language can be used. Thus, there may exist limitations that restrict the ability to update and modify decision logic on the client side.

As another example benefit, when new policies are put in place, components such as adaptors can be updated to reflect the new terms of the policies without affecting other adaptors that are not related to the policy. For example, customers of the CDC (that utilize the services of the CDC) such as various streaming services can generate profiles and make updates to the profiles without influencing other components corresponding to other customers.

Content distribution coordinator 300 is illustrated as a single logical device in FIG. 3. In some embodiments, content distribution coordinator 300 comprises standard commercially available server hardware (e.g., a multi-core processor, 4+ Gigabytes of RAM, and one or more Gigabit network interface adapters) and runs typical server-class operating systems (e.g., Linux), as well as Java HTTP server software stack. Content distribution coordinator 300 can also be implemented using a scalable, elastic architecture and may comprise several distributed components, including components provided by one or more third parties. Further, when content distribution coordinator 300 is referred to herein as performing a task, such as storing data or processing data, it is to be understood that a sub-component or multiple sub-components of content distribution coordinator 300 (whether individually or in cooperation with third party components) may cooperate to perform that task.

Figure 4:
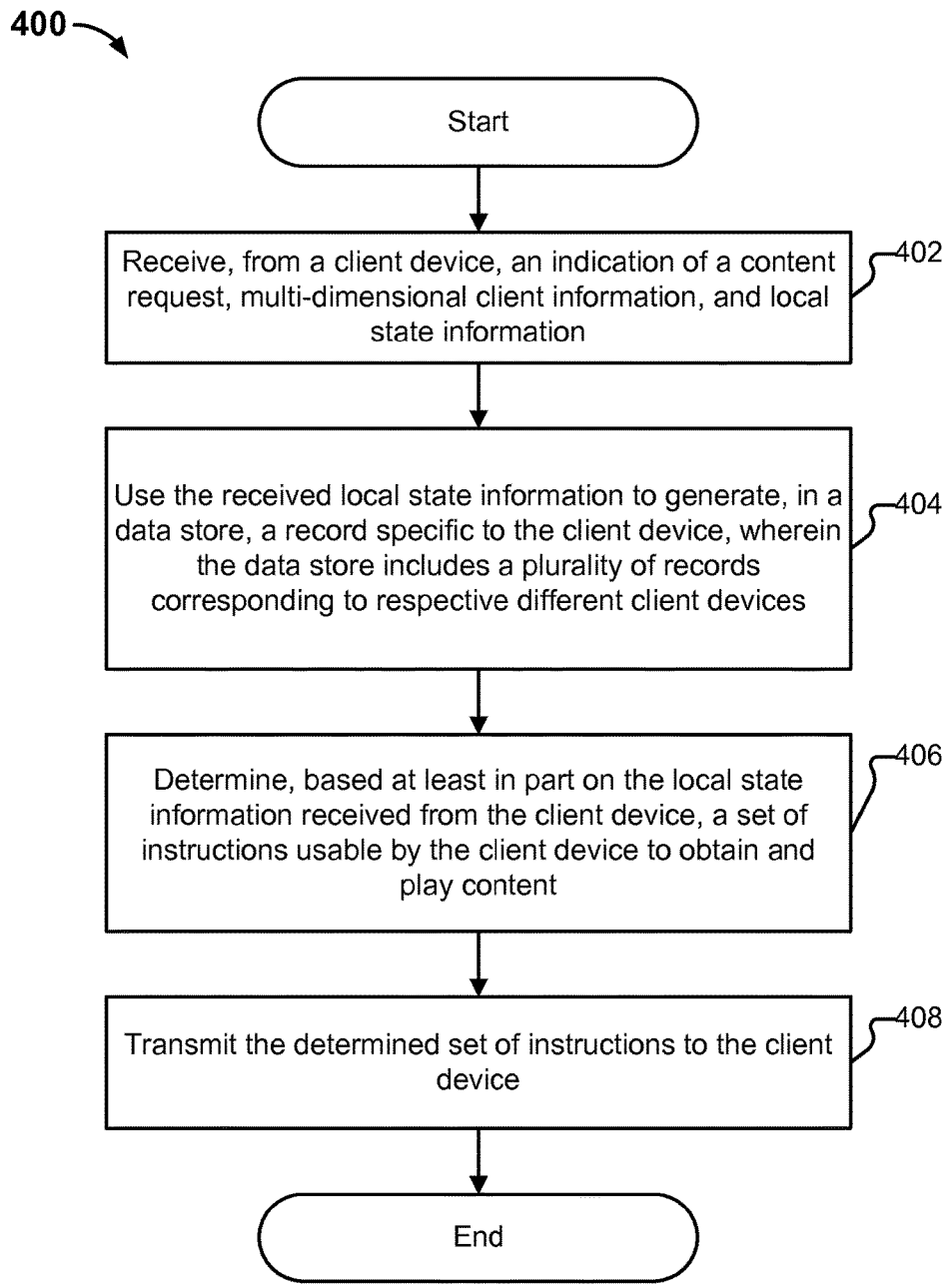
FIG. 4 is a flow diagram illustrating an embodiment of a process for generating a streaming decision.

FIG. 4 is a flow diagram illustrating an embodiment of a process for generating a streaming decision. In some embodiments, process 400 is executed by content distribution coordinator 300 of FIG. 3.

The process begins at 402, when an indication of a content request is received from a client device. In some embodiments, the client is executing a thin application that is configured to enforce received instructions. The client may also include logic for monitoring/collecting local client state information and for handling failover.

Client-specific information, including multi-dimensional client information associated with the client, as well as local state information associated with the client is also received.

In some embodiments, multi-dimensional client information associated with the client device is received, such as client device type, video protocol type, streamer type (e.g., a mobile application or "app" from which the streaming request originated, a browser player, etc.), asset type, user agent, custom tags, session identifiers, etc. Other attribute information, such as operating system of the client, geolocation information associated with the client, ASN, last mile connection, etc. can also be received.

The information received from the client can also include local client state information. The local client state information can include raw event information, such as the amount of data/number of chunks of content downloaded by the client, the amount of time taken by a client to download a chunk, etc. Information such as the current bandwidth (e.g., estimates/measurements of bandwidth) of the client, the bitrate of the content/chunk currently being streamed, the size of a current chunk, the amount of data (e.g., in bytes) downloaded so far, and buffer state information (e.g., buffer length, current buffer capacity, etc.) can also be received. Other local client state information and measurements can include current CDN, current player state (e.g., playing, buffering, pause, stopped), current player head time/position, frame rate, etc. Summary information of aggregated client state information can also be received. The summary information can include summaries of state changes and client history. In some embodiments, the summary information is received from the client. In other embodiments, the summary information is generated using information collected from a client over time.

In some embodiments, the information received from the client is received in batches, for example, as the payload of a heartbeat message. The heartbeats can be sent on a time driven basis (e.g., periodically). Instructions can also be sent that instruct the client to dynamically change a heartbeat interval (e.g., shorter or longer), for example, based on a status of the downloading at the client (e.g., if the quality/performance of the client has been stable for a sustained period of time, the heartbeat interval can be lengthened).

At 404, a record specific to the client device is generated using the received client information. For example, a client-specific record is generated in data store 318 of FIG. 3. In some embodiments, the record is generated in a data store that includes multiple records corresponding to respective different client devices. Each record is used to store per-client information pertaining to a particular given client device. In some embodiments, the per-client records are generated using information received from clients (e.g., via heartbeats). The records can include items directly received, as well as items that are generated based on processing information over time (e.g., summary information), where the processing can be performed either at the client or at a backend such as content distribution coordinator 300 of FIG. 3.

As described above, the items stored in per-client storage can include a (unique) identifier for the client, an identifier for a video session, local client states and current measurements, and summary information (e.g., of client state changes). As described above, a session refers to an entity representing an instance of a user's playback interactions with a content asset. The session may begin with a user's request for a particular content, and end when the user ceases playing the content (e.g., the user stops watching a requested video).

As described above, in various embodiments, the client local state information and current measurements of a client stored in per-client data records, can include a client's current bit-rate, current CDN, current player state (e.g., playing, buffering, pause, stopped), current player buffer length, current play head time/position, current bandwidth measurement estimations, current frame rate, etc.

As described above, the items stored in the per-client records can also include historical information associated with a specific client, such as a summary of state changes of the client as described above. The summary of the state changes can include: all of the bit-rates played so far and the playing time and buffering time for each one; all the CDNs used so far and the play time, buffering time and errors for each one; sliding window of segment download info (e.g., start time, end time, duration, bytes, etc.); sliding window of average download bandwidth, sliding window of frame rate measurements; other historical information about the user interactions (e.g., seeking forward, seeking backwards, etc.). In some embodiments, the summary information is generated using client information from multiple client heartbeats, aggregated over time. The summary information can be generated by the client (e.g., by locally summarizing events and measurements, which are then sent to a backend in heartbeats) or at a backend such as content distribution coordinator 300 of FIG. 3 (e.g., generated using data aggregated/collected/accumulated from the client over time).

At 406, a set of instructions usable by the client device to obtain and play content is determined. In some embodiments, the set of instructions is determined based on the local state information received from the client device. The instructions can also be determined based on both multi-dimensional client information and global shared data, as described above, where the global shared data includes performance data aggregated from a plurality of clients. For example, the multi-dimensional attributes of the requesting client can be used to determine a segment/partition of correlated/similar other clients. The performance of the identified segment/partition of other clients can be used in conjunction with the local state information to determine instructions targeted for/specific to the context of the requesting client. In some embodiments, the set of instructions is made in response to each heartbeat that is received.

Determining the instructions can include determining an optimal content source (e.g., CDN) and/or bitrate (or resolution) for content to be obtained by the client. In some embodiments, determining the instructions includes performing an optimization, such as optimizing the utilization of a client playback buffer. The instructions can be made on a chunk-by-chunk basis, where a decision is made for each chunk to be downloaded by the client. If the streaming decision results in a switch in content source and/or bitrate for the client (e.g., from an existing content source and/or bitrate of which there is a record), a decision as to when the client should be instructed is also made. As one example, the client can be instructed to abandon the current chunk being downloaded and switch to a new chunk (selected by the backend based on selected CDN and/or bitrate) immediately. As another example, the client can be instructed to change to a new chunk on the next chunk boundary. Another example instruction is to instruct the client to continue as is (i.e., make no switch).

At 408, the determined set of instructions is sent to the remote client. The instructions are then executed and enforced by the client.

As clients continue to send multi-dimensional and local state information to a backend (e.g., via heartbeat messages), the records associated with those client devices are updated. The updated information stored in the updated records can be used to further refine the determination of instructions using client and global data that is updated dynamically, in real-time. Updated instructions based on the updated data can then be sent to clients on a per-client basis.

For example, a client device can be configured to transmit heartbeat messages throughout the duration of a streaming session. Based on the client information included in the subsequent heartbeats and the global data associated with similar clients, a new content source and/or bitrate can be determined. For example, if a received heartbeat indicated that a rebuffering event has occurred on the streaming client, it can be determined that a new set of instructions should be sent (which may cancel or alter previous instructions that have not been executed). The new instructions are then sent to the client.

Example Streaming Decision Scenario

The following is an example scenario in which different streaming decisions are made for different types of streamers. For example, suppose that a first client streamer corresponds with an HBO® iOS® app, while a second client streamer corresponds with the ESPN® app for the Amazon® Fire Phone. A third client streamer is associated with a newly established service.

The different CDN and/or Bitrate-tuples available for various apps on different customers (e.g., customers of the entity operating the backend infrastructure) may be different. One customer's app may require more frequent bitrate recommendations than another's. Similarly, one app may not be able to perform seamless CDN switches. Different clients may also have different capabilities with regard to switching. For example, different clients may or may not be able to perform seamless CDN switching under different conditions (e.g., because chunks on multi-CDNs are aligned, or exactly the same). Such client capability information can be sent to or configured on a backend such as content distribution coordinator 300 of FIG. 3, such that the backend can be configured to take each client's capabilities into consideration when making a streaming decision for a particular client. In such a scenario, as described above, the backend may be configured to be more conservative in suggesting mid-stream CDN switches.

Clients, such as the third client streamer, where an app may not yet have any significant data available, may still be able to leverage the data aggregated/collected from other devices/apps that are, for example, associated with the same customer. Suppose, for example, that a customer has five app integrations (e.g., the customer has video streaming apps on five different types of devices) and the customer would like to launch a new device using the same streaming protocol across all of their devices. The streaming decision making for this new app can be configured to use CDN-bitrate performance data that is already available for the five existing apps, until such time as the backend has seeded the new app with its own data.

Figure 5:
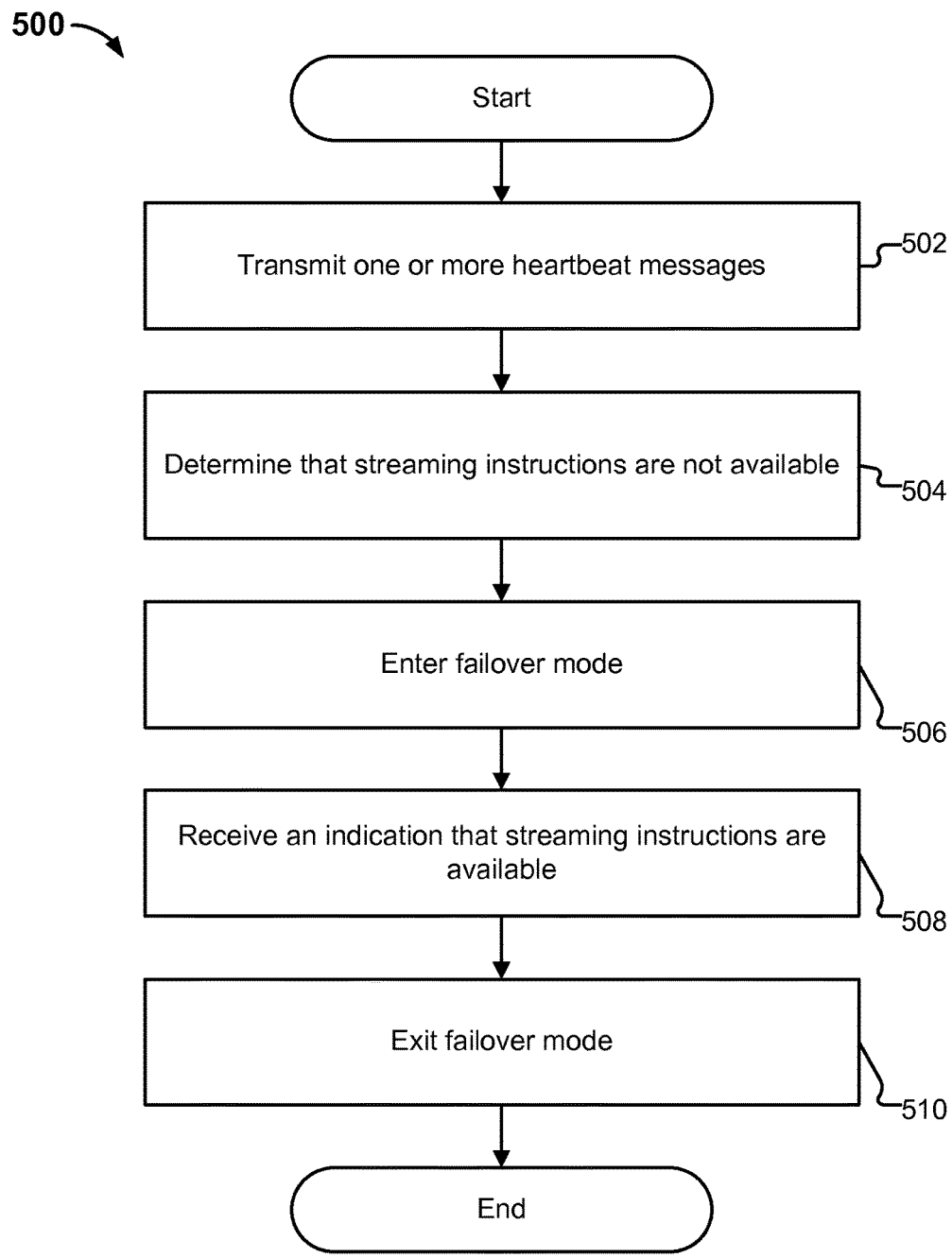
FIG. 5 is a flow diagram illustrating an embodiment of a process for performing failover.

FIG. 5 is a flow diagram illustrating an embodiment of a process for performing failover. In some embodiments, process 500 is executed by client 200 of FIG. 2.

The process begins at 502 when one or more heartbeat messages are transmitted. At 504, it is determined that streaming instructions are not available. For example, it can be determined that response(s) to the transmitted heartbeats have not been received (e.g., from a backend) according to a set of rules/criteria (e.g., after a threshold number of transmitted heartbeats or after a threshold amount of time), indicating that communication of instructions from a backend is not available. At 506, a failover mode is entered in response to the determination. In some embodiments, upon entering the failover mode, the client migrates to a mode in which streaming can be performed independently of the backend. For example, a default streamer resident on a client can be used. During the failover mode, attempts at transmitting heartbeats are continued. At 508, an indication that streaming instructions can be communicated is received. For example, a response to a previously transmitted heartbeat can be received from a backend, indicating that communication with the backend has been re-established. As another example, the backend may be polling the client, where receipt of the polling request also indicates that streaming instructions can be received from the backend. At 510, in response to the re-establishment in communications, the failover mode is exited.

The following is an example failover scenario. In this example, a client begins failover if it encounters an error (e.g., downloading error or file error), and a response has not been received from the backend (e.g., CDC) for the last two heartbeats. The client may then revert to/use any default logic (e.g., existing built-in streamer) to handle streaming. The client is configured to continue to send out heartbeats continuously with the last specified interval (e.g., received from the backend as part of instructions/response). Once the client receives a response from the backend again, the client terminates failover mode and follows the instructions provided by the backend.

Example Scenarios in which Different Instructions are Determined

As described above, various types of instructions can be sent to clients regarding streaming decisions (e.g., whether to switch, and if so, when) made by a backend (such as content distribution coordinator 300 of FIG. 3) on behalf of the client to be executed. The following are examples of scenarios in which different instructions are made on behalf of a client.

The following examples illustrate the various inputs taken into consideration when generating a decision. As described above, the inputs can include client-specific information transmitted by a client (e.g., via heartbeats) including client bandwidth, buffer length, current chunk bitrate, chunk size, the bytes loaded so far (progress of the client in downloading the current chunk), round trip time (e.g., for heartbeat and processing, and return of instructions), candidate bitrates, etc. Other multi-dimensional client information can also be received from the client as described above. A backend, such as content distribution coordinator 300 of FIG. 3 uses the local state information, in conjunction with global shared data, as described above, to determine an optimal decision for maximizing the quality of the experience for the requesting client (e.g., by making decisions that minimize buffering). The example instructions can be to not make any switch, to make a switch in mid-stream, to make a switch at the next boundary, as well as instructions to cease current downloading in the event that it is determined that the client cannot finish downloading of a current chunk.

No Switch Example Instructions

An instruction can be sent to not switch streams (chunks) if a player is downloading at the highest bitrate and bandwidth is high enough to keep the player's buffer growing. For example, the bandwidth of the client is 12 Mbps (megabits per second), while the player is downloading at the highest bitrate of 6 Mbps.

As another example, a no-switch instruction can be determined and sent if the player is downloading at the lowest bitrate (e.g., 560 Kilobits per second (Kbps)), and the bandwidth is lower than the lowest bitrate (e.g., 300 Kbps). Switching to a higher bitrate will cause more frequent and longer buffering.

As another example, a no-switch instruction can be sent if the buffer length of the requesting client/player/streamer is large enough to keep playback uninterrupted even if bandwidth drops. For example, suppose that the bandwidth of the client drops from 13 Mbps to 5 Mbps, and the buffer length of the client is 120 seconds. If the player is downloading at the highest bitrate of 6 Mbps, with the long buffer length, no buffering will be introduced before the next heartbeat is sent. Thus, the backend decides that no switch should be executed.

Switching Examples

Mid-Chunk Switching

As described above, a client can be instructed to make a switch mid-chunk (i.e., while the player is still in the process of downloading a chunk).

A switch instruction can be sent to instruct the client to switch up to a higher bitrate, mid-chunk, if bandwidth is high enough to maintain growth of the player's buffer, even if the current chunk is given up. For example, consider the following scenario: suppose that the bandwidth available to the client is 3333 Kbps, the buffer length is 2 seconds, and the player is downloading content at a bitrate of 500 Kbps, with chunk size of 250 KB (Kilobytes). Candidate bitrates are: 500 Kbps, 1000 Kbps, and 2000 Kbps. In this example scenario, it is determined by the backend that downloading a chunk from a higher bitrate of 1000 Kbps will take less than two seconds, including client ⇔ CDN Round Trip Time (RTT). Thus, the player's buffer will continue to grow. However, it is determined by the backend that switching up to 2000 Kbps will exceed 2 seconds, which would introduce buffering. In such a situation, the backend will decide to give up the current chunk and switch up to the 1000 Kbps to provider higher resolution as early as possible while avoiding buffering.

As another example, a switch instruction can be sent by the backend to instruct the client to switch up to a higher bitrate, mid-chunk, if the buffer length is large enough to tolerate slower chunk downloading. Consider the following example scenario, in which the client's available bandwidth is 1000 Kbps, the player's buffer length is 60 seconds, and the player is downloading chunks encoded at a bitrate of 500 Kbps, with chunk sizes of 250 KB. Candidate bitrates for content are 500 Kbps, 1000 Kbps, and 2000 Kbps. Giving up the current chunk and switching to 2000 Kbps can guarantee no buffering before the next heartbeat is sent while the viewer can watch at a higher resolution as early as possible. Therefore, although the bandwidth is lower than the highest bitrate, the backend will decide to give up the current chunk and switch up to 2000 Kbps immediately.

As another example, a switch instruction can be sent by the backend to instruct the client to switch down to a lower bitrate, mid-chunk, if the bandwidth drops such that switching to a lower bitrate immediately brings zero buffering time or less buffering time than finishing the current chunk. Consider the following example scenario, in which a client has a bandwidth of 1853 Kbps, a buffer length of 4 seconds, and the player is downloading chunks encoded at a bitrate of 2694 Kbps, with a chunk size of 2.5 MB. At the time that the backend receives a client request, only 13 KB have been loaded. Finishing the current chunk at 2694 Kbps will take approximately 10 seconds, which will introduce more than 6 seconds of buffering. Giving up the current chunk and downloading a chunk from 1028 Kbps will take less than 5 seconds, which corresponds to a smaller buffering time than if staying at 2694 Kbps. Thus, the backend will decide to immediately switch down to the lowest bitrate.

Next Chunk Boundary Switching

As described above, a client can be instructed to make a switch at the next chunk (i.e., at the next chunk boundary, when the client finishes processing a current chunk).

As another example, a switch instruction can be sent by the backend to instruct the client to switch up to a higher bitrate on the next chunk if the buffer length is so small that giving up the current chunk will introduce buffering, even though available bandwidth is sufficiently high. Consider the following example scenario, in which, at the beginning of a video session, a player starts from a bitrate of 3 Mbps, where the client has a bandwidth of 12 Mbps. In this example, buffer length is only 1 second. Thus, although bandwidth is high, giving up the current chunk and switching up to the highest bitrate of 5 Mbps will still introduce extra buffering due to the small buffer length. In this scenario, the backend will decide to have the client finish the current chunk and switch up to a higher bitrate when the next chunk is downloaded.

As another example, a switch instruction can be sent by the backend to instruct the client to switch down to a lower bitrate on the next chunk if a player has already downloaded enough bytes of the current chunk when bandwidth drops, and finishing the current chunk results in the smallest buffering time as compared to giving up the current chunk. Consider the following example scenario, in which the client's bandwidth is 1 Mbps (Megabits per second), the content bitrate is 1.5 Mbps, the buffer length is 2 seconds, chunk size is 1.8 MB, and the bytes loaded so far are 1.5 MB. In this example, candidate bitrates are 500 Kbps, 1 Mbps, and 1.5 Mbps. Although bandwidth is lower than the current downloading bitrate, finishing the current chunk will take less than 3 seconds, while giving up the current chunk and downloading the same chunk from the lowest bitrate will take more than 7 seconds. Thus, in this situation, the backend decides that it is better to finish the current chunk and then switch to the lowest bitrate on the next chunk to minimize the buffering time.

As another example, a switch instruction can be sent by the backend to instruct the client to switch down to a lower bitrate on the chunk if bandwidth drops but buffer length is long enough to guarantee uninterrupted playback if downloading of the current chunk is finished. However, buffering will be introduced if the client stays at the current bitrate when loading the next chunk. Consider the following scenario, in which bandwidth is 1 Mbps, bitrate is 1.5 Mbps, buffer length is 12 seconds, chunk size is 1.8 MB, and the bytes loaded is 1 MB. Candidate bitrates are 500 Kbps, 1 Mbps, and 1.5 Mbps. Although bandwidth is lower than the current downloading bitrate, finishing the current chunk will take less than 7 seconds, which will not introduce any buffering. Thus, in this scenario, the backend decides to instruct the client to finish the current chunk, but switch to the lowest bitrate when the next chunk is downloaded so that no buffering will be introduced while the player is allowed to play at the higher resolution for as long as possible.

Stuck Condition

In some situations, the client may enter a "stuck" state, where it is unable to finish downloading a chunk. For example, if the player has not made any progress in downloading a chunk for a period of time, the backend determines/infers that the player cannot finish downloading that chunk. In such a scenario, the backend sends instructions to the client that specify the particular chunk on which the client is stuck (identified using the chunk's chunk URL) in the response, and instructs the client to give up that chunk if it is still attempting to download the chunk. Consider the following example scenario, in which the bitrate is 3.8 Mbps, buffer length is 60 seconds, chunk size is 4.4 MB, and bytes loaded is 3.3 MB. The player has indicated that there has been no progress in downloading the current chunk during the past 10 second (e.g., no more bytes have been loaded in the past 10 seconds). Although the buffer length is long, the backend will make a determination that the client should give up the current chunk, as it believes that the client can no longer finish downloading that chunk. In the instruction response to the client, the backend specifies the chunk URL and another bitrate (usually lower than the current bitrate, but not necessarily). When the client receives the response, the client checks the URL of the chunk that is being downloaded. If the URL of the current chunk matches the URL specified in the response, the client gives up the current chunk and switches to the bitrate specified in the instructions/response. Otherwise, the client stays at the current bitrate.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a set of one or more processors configured to, using a set of one or more interfaces:
receive, from a client device:
an indication of a content request;
multi-dimensional client information associated with the client device; and
local state information associated with the client device;
use the received local state information to generate, in a data store, a record corresponding to the client device, wherein the data store includes a plurality of records corresponding to respective different client devices;
store in the generated record, session information associated with a video session initiated at the client device, wherein the stored session information comprises an identifier of the video session;
based at least in part on the received multi-dimensional client information, identify a set of clients correlated to the client device;
obtain performance information associated with the identified set of clients;
based at least in part on both the local state information received from the client device and the obtained performance information associated with the set of clients identified as correlated to the client device based at least in part on the multi-dimensional client information received from the client device, determine, for the video session, a set of instructions usable by the client device to obtain and play content;
transmit the determined set of instructions to the client device;
store, in the record including the session information comprising the identifier of the video session, the set of instructions determined for the video session as historical information; and
a memory coupled to the set of one or more processors and configured to provide the set of one or more processors with instructions.

2. The system recited in claim 1, wherein the local state information includes at least one of current bit-rate, current CDN, current player state, current player buffer length, current play head position, current bandwidth measurement estimations, and current frame rate.

3. The system recited in claim 1, wherein the multi-dimensional client information includes at least one of device type, video protocol type, streamer type, asset type, user agent, tags, and the session identifier.

4. The system recited in claim 3, wherein the set of one or more processors is configured to, using the set of one or more interfaces, identify the set of clients correlated to the client device based at least in part on the at least one of device type, video protocol type, streamer type, asset type, user agent, tags, and the session identifier.

5. The system recited in claim 1, wherein determining the set of instructions includes determining whether the client device should be instructed to make a switch in at least one of a content source and a bitrate for a chunk to be obtained.

6. The system recited in claim 5, wherein the client device is instructed, based on the determination, to perform no switch.

7. The system recited in claim 5, wherein the client device is instructed, based on the determination, to perform a switch.

8. The system recited in claim 7, wherein the set of instructions includes an instruction on when to perform the switch.

9. The system recited in claim 8, wherein the client device is instructed to perform the switch at a next chunk boundary.

10. The system recited in claim 8, wherein the client device is instructed to perform the switch mid-chunk.

11. The system recited in claim 1, wherein the set of instructions is determined based at least in part on at least one of bandwidth available to the client device, a buffer length associated with the client device, a bitrate of a current chunk being downloaded, and a size of the current chunk.

12. The system recited in claim 11, wherein the determining the set of instructions includes performing a selection from a plurality of candidate content sources.

13. The system recited in claim 11, wherein the determining the set of instructions includes performing a selection from a plurality of candidate bitrates.

14. The system recited in claim 1, wherein the client device is configured to enforce the determined set of instructions.

15. The system recited in claim 1, wherein the client device is configured to enter a failover mode.

16. The system recited in claim 15, wherein the client device is configured to enter the failover mode in response to determining that no response has been received for a threshold number of heartbeat messages.

17. The system recited in claim 15, wherein entering into the failover mode includes reverting to a default streamer that is configured to operate independently of received instructions.

18. The system recited in claim 15, wherein the client device is configured to continue to transmit heartbeat messages during the failover mode.

19. The system recited in claim 1, wherein determining the set of instructions includes identifying an appropriate adaptor based at least in part on the multi-dimensional client information.

20. The system recited in claim 19, wherein the identified adaptor is used to obtain an appropriate streaming policy.

21. The system recited in claim 1, wherein the set of one or more processors is further configured to, using the set of one or more interfaces:
receive updated local state information; and
update the record specific to the client device using the received updated local state information.

22. The system recited in claim 1, wherein the set of instructions is generated at the beginning of the video session.

23. The system recited in claim 1, wherein the set of instructions is generated mid-session.

24. The system recited in claim 1, wherein the set of one or more processors is further configured to, using the set of one or more interfaces:
receive performance information associated with the set of instructions determined for the video session; and
associate the received performance information with the set of instructions stored in the record.

25. A method, comprising:
receiving, from a client device:
an indication of a content request;
multi-dimensional client information associated with the client device; and
local state information associated with the client device;
using the received local state information to generate, in a data store, a record corresponding to the client device, wherein the data store includes a plurality of records corresponding to respective different client devices;
storing in the generated record, session information associated with a video session initiated at the client device, wherein the stored session information comprises an identifier of the video session;
based at least in part on the received multi-dimensional client information, identifying a set of clients correlated to the client device;
obtaining performance information associated with the identified set of clients;
based at least in part on both the local state information received from the client device and the obtained performance information associated with the set of clients identified as correlated to the client device based at least in part on the multi-dimensional client information received from the client device, determining, for the video session and using a set of one or more processors, a set of instructions usable by the client device to obtain and play content;
transmitting the determined set of instructions to the client device; and
storing, in the record including the session information comprising the identifier of the video session, the set of instructions determined for the video session as historical information.

26. The method of claim 25, wherein the local state information includes at least one of current bit-rate, current CDN, current player state, current player buffer length, current play head position, current bandwidth measurement estimations, and current frame rate.

27. The method of claim 25, wherein the multi-dimensional client information includes at least one of device type, video protocol type, streamer type, asset type, user agent, tags, and the session identifier.

28. The method of claim 27, further comprising identifying the set of clients correlated to the client device based at least in part on the at least one of device type, video protocol type, streamer type, asset type, user agent, tags, and the session identifier.

29. The method of claim 25, wherein determining the set of instructions includes determining whether the client device should be instructed to make a switch in at least one of a content source and a bitrate for a chunk to be obtained.

30. The method of claim 29, wherein the client device is instructed, based on the determination, to perform no switch.

31. The method of claim 29, wherein the client device is instructed, based on the determination, to perform a switch.

32. The method of claim 31, wherein the set of instructions includes an instruction on when to perform the switch.

33. The method of claim 32, wherein the client device is instructed to perform the switch at a next chunk boundary.

34. The method of claim 32, wherein the client device is instructed to perform the switch mid-chunk.

35. The method of claim 25, wherein the set of instructions is determined based at least in part on at least one of bandwidth available to the client device, a buffer length associated with the client device, a bitrate of a current chunk being downloaded, and a size of the current chunk.

36. The method of claim 35, wherein the determining the set of instructions includes performing a selection from a plurality of candidate content sources.

37. The method of claim 35, wherein the determining the set of instructions includes performing a selection from a plurality of candidate bitrates.

38. The method of claim 25, wherein the client device is configured to enforce the determined set of instructions.

39. The method of claim 25, wherein the client device is configured to enter a failover mode.

40. The method of claim 39, wherein the client device is configured to enter the failover mode in response to determining that no response has been received for a threshold number of heartbeat messages.

41. The method of claim 39, wherein entering into the failover mode includes reverting to a default streamer that is configured to operate independently of received instructions.

42. The method of claim 39, wherein the client device is configured to continue to transmit heartbeat messages during the failover mode.

43. The method of claim 25, wherein determining the set of instructions includes identifying an appropriate adaptor based at least in part on the multi-dimensional client information.

44. The method of claim 43, wherein the identified adaptor is used to obtain an appropriate streaming policy.

45. The method of claim 25, further comprising:
receiving updated local state information; and
updating the record specific to the client device using the received updated local state information.

46. The method of claim 25, wherein the set of instructions is generated at the beginning of the video session.

47. The method of claim 25, wherein the set of instructions is generated mid-session.

48. The method of claim 25, further comprising:
receiving performance information associated with the set of instructions determined for the video session; and
associating the received performance information with the set of instructions stored in the record.

49. A computer program product embodied in a non-transitory computer readable storage medium and comprising computer instructions for:
receiving, from a client device:
an indication of a content request;
multi-dimensional client information associated with the client device; and
local state information associated with the client device;
using the received local state information to generate, in a data store, a record corresponding to the client device, wherein the data store includes a plurality of records corresponding to respective different client devices;
storing in the generated record, session information associated with a video session initiated at the client device, wherein the stored session information comprises an identifier of the video session;
based at least in part on the received multi-dimensional client information, identifying a set of clients correlated to the client device;
obtaining performance information associated with the identified set of clients;
based at least in part on the local state information received from the client device and the obtained performance information associated with the set of clients identified as correlated to the client device based at least in part on the multi-dimensional client information received from the client device, determining, for the video session and using a set of one or more processors, a set of instructions usable by the client device to obtain and play content;
transmitting the determined set of instructions to the client device; and
storing, in the record including the session information comprising the identifier of the video session, the set of instructions determined for the video session as historical information.

* * * * *